(12) United States Patent
Morozov et al.

(10) Patent No.: US 10,401,511 B2
(45) Date of Patent: Sep. 3, 2019

(54) DUAL RESONANT SINGLE APERTURE SEISMIC SOURCE

(71) Applicant: Teledyne Instruments, Inc., Thousand Oaks, CA (US)

(72) Inventors: Andrey K. Morozov, North Falmouth, MA (US); Douglas C. Webb, Falmouth, MA (US)

(73) Assignee: TELEDYNE INSTRUMENTS, INC., Thousand Oaks, CA (US)

( * ) Notice: Subject to any disclaimer, the term of this patent is extended or adjusted under 35 U.S.C. 154(b) by 174 days.

(21) Appl. No.: 15/463,987

(22) Filed: Mar. 20, 2017

(65) Prior Publication Data

US 2017/0276812 A1   Sep. 28, 2017

Related U.S. Application Data

(60) Provisional application No. 62/313,326, filed on Mar. 25, 2016.

(51) Int. Cl.
*G01V 1/137*   (2006.01)
*G01V 1/133*   (2006.01)

(52) U.S. Cl.
CPC .............. *G01V 1/137* (2013.01); *G01V 1/133* (2013.01)

(58) Field of Classification Search
CPC ................................ G01V 1/137; G01V 1/133
USPC ........................................................ 367/144
See application file for complete search history.

(56) References Cited

U.S. PATENT DOCUMENTS

| | | |
|---|---|---|
| 3,219,970 A | 11/1965 | Sims |
| 4,381,044 A | 4/1983 | Kirby |
| 4,483,411 A | 11/1984 | Mifsud |
| 4,556,120 A | 12/1985 | Kirby |
| 7,823,689 B2 | 11/2010 | Aronstam et al. |
| 8,331,198 B2 | 12/2012 | Morozov et al. |
| 8,441,892 B2 | 5/2013 | Morozov et al. |
| 8,570,835 B2 | 10/2013 | Chelminski |
| 8,634,276 B2 | 1/2014 | Morozov et al. |
| 8,670,293 B2 | 3/2014 | Morozov |
| 8,689,935 B2 | 4/2014 | Wilson et al. |
| 8,942,060 B2 | 1/2015 | Abma et al. |

(Continued)

FOREIGN PATENT DOCUMENTS

EP   0238736 A1   9/1987

OTHER PUBLICATIONS

Morozov, A., "Doubly-Resonant Underwater Acoustic Projector for Long-Range Communications and Position," Woods Hole Oceanographic Institution, downloaded from http://www_whoi.edu/hpb/viewPage.do?id=1533&cl=4 on Apr. 4, 2015.

(Continued)

*Primary Examiner* — Daniel L Murphy
(74) *Attorney, Agent, or Firm* — K&L Gates LLP

(57) ABSTRACT

A sound source including a first gas filled underwater resonator, a second gas filled underwater resonator connected to the first resonator, where the second resonator comprises a Helmholtz resonator, and at least one excitation member configured to excite the first resonator and the second resonator is disclosed. The first resonator is permanently tuned to produce a first resonant frequency upon excitation by the at least one excitation member and the second resonator is permanently tuned to produce a second resonant frequency upon excitation by the at least one excitation member. The first resonant frequency is different from the second resonant frequency.

15 Claims, 31 Drawing Sheets

(56) References Cited

U.S. PATENT DOCUMENTS

| | | |
|---|---|---|
| 9,383,463 B1 | 7/2016 | Morozov et al. |
| 2004/0112594 A1 | 6/2004 | Aronstam et al. |
| 2013/0001010 A1 | 1/2013 | Wilson et al. |
| 2013/0010573 A1 | 1/2013 | Morozov et al. |
| 2014/0056108 A1 | 2/2014 | Chelminski |
| 2017/0031039 A1 | 2/2017 | Morozov et al. |

OTHER PUBLICATIONS

Morozov, A., "Modeling and Testing of Carbon-Fiber Doubly-Resonant Underwater Acoustic Transducer," Proceedings of the 2013 COMSOL Conference in Boston.

Avedik F. et al. "Single Bubble Air-Gun Array for Deep Exploration," Geophysics Society of Exploration, vol. 58. No. 3. Mar. 1, 1993, pp. 366-382.

Morozov et al., "Underwater turnable organ-pipe sound source," The Journal of the Acoustical Society of America, Aug. 2007, pp. 777-785.

Extended European Search Report for European Application No. EP 17162449, dated Aug. 22, 2017.

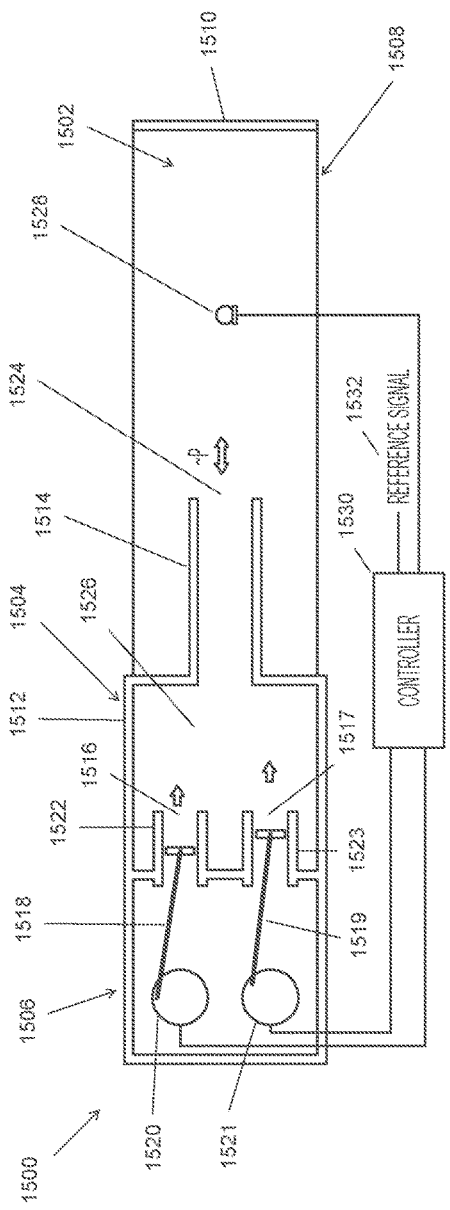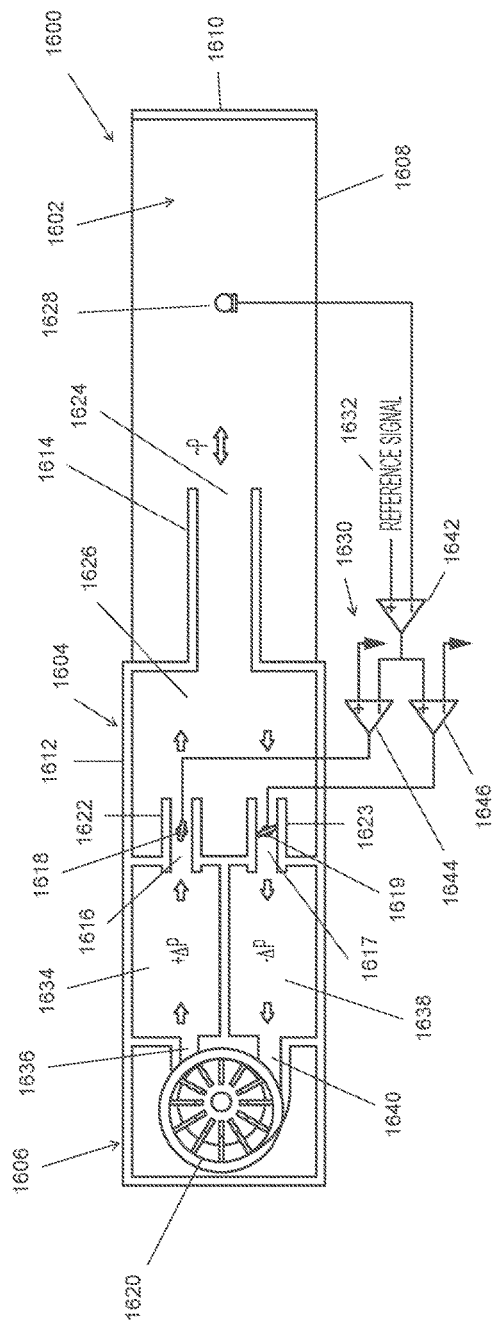

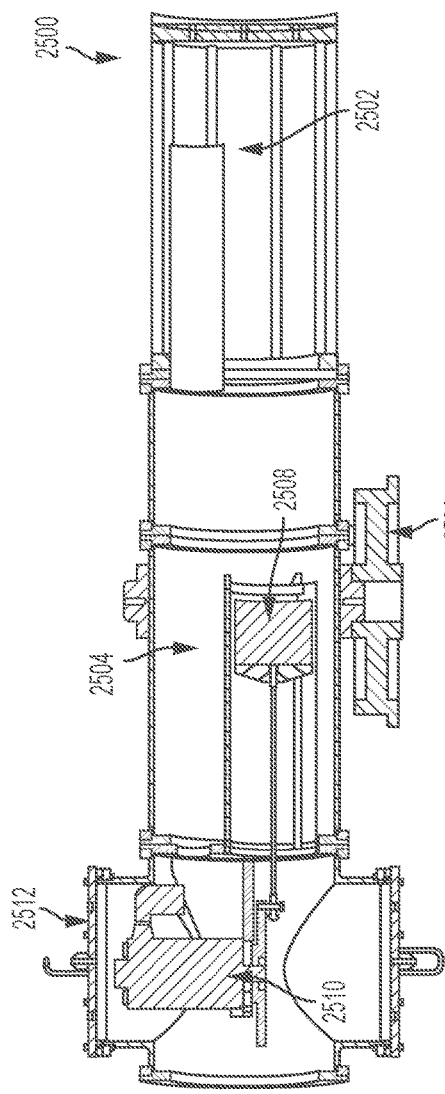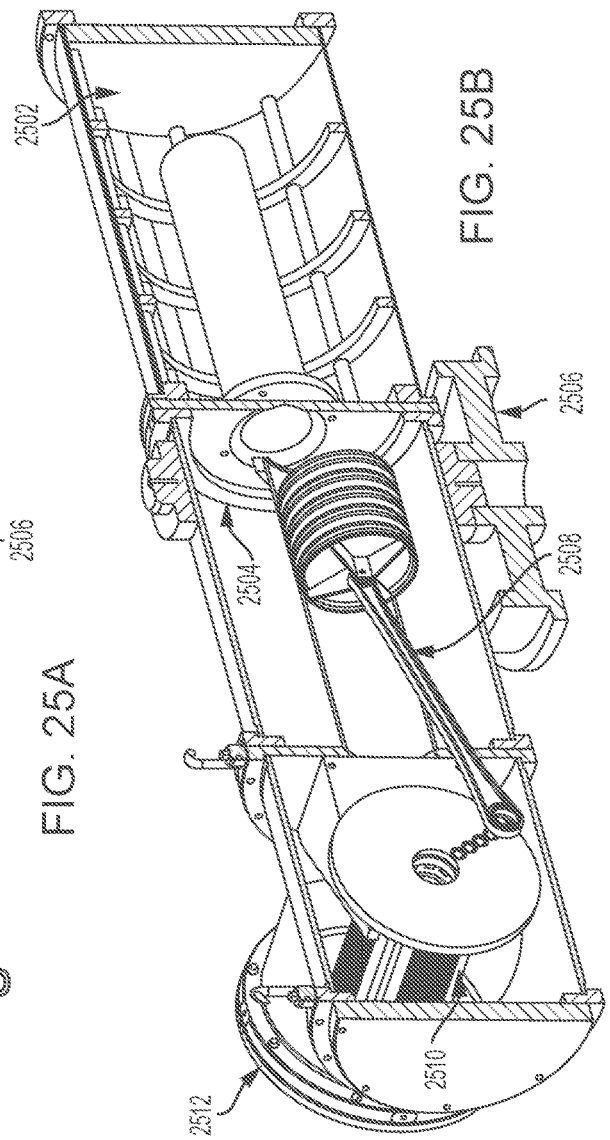

DUAL RESONANT SINGLE APERTURE SEISMIC SOURCE

PRIORITY

This application claims the benefit of U.S. Provisional Patent Application Ser. No. 62/313,326, entitled DUAL RESONANT SINGLE APERTURE SEISMIC SOURCE, filed Mar. 25, 2016, the entire disclosure of which is hereby incorporated by reference herein.

BACKGROUND

Low frequency acoustic and seismo-acoustic projectors find applications in marine seismic operations, underwater ocean acoustic tomography, long-range acoustic navigation and communications and deep-bottom penetration seismic profiling in the offshore oil and gas industry. Such seismic sources may be used in Arctic under-ice acoustic far-range navigation and communications, underwater global positioning systems (RAFOS), and long-range ocean acoustic tomography and thermometry. Low-frequency underwater sound sources should be powerful and efficient.

The low frequency source can be an explosive (e.g. dynamite), or it can use more complicated technology such as an air gun providing single pulses, or vibroseis providing continuous frequency sweeps. Some acoustic sources in use for seismic applications, such as air guns, plasma (sparker) sound sources and boomers, are of the impulse type, where the transmitter emits a large non-coherent pressure pulse during a short time interval. Seismic air-gun surveys, such as those used in the exploration of oil and gas deposits underneath the ocean floor, produce loud, sharp impulses that propagate over large areas and increase noise levels substantially. Such a signal is not highly controllable, either in frequency content or repeatability. Coherent sound sources such as marine vibroseis may be much quieter and potentially less harmful for marine environments and should be used instead of air-guns in certain exploration activities.

Current continuous wave type sources make use of hydraulic, pneumatic, piezo-electric or magnetostrictive drivers and different types of resonance systems to store acoustic energy and to improve impedance matching, when generating low-frequency sound waves in water. The power output of a simple acoustic source is proportional to the squares of volume, velocity, and frequency and needs a large vibrating area to achieve reasonable levels. As a result, the sound source can become unacceptably large and expensive.

Seismic sources in the form of an underwater gas-filled balloon (or bubble) have been proposed and patented, for example in U.S. Pat. Nos. 8,441,892, 8,331,198, and 8,634,276, the entire disclosures of which are hereby incorporated by reference herein. A resonant bubble seismic source is a simple, efficient, narrow-band projector. The resonant bubble seismic source, also called a bubble resonator, may have a Q factor in shallow water that is approximately equal to 40 and its frequency band may be narrow.

Seismic survey applications may demand a large frequency band and underwater bubble sources may be mechanically tuned over a large frequency band. To cover a large frequency band, a tunable air-bubble resonator has been patented, for example in U.S. Pat. No. 8,634,276. In that system, a projector changes its resonance frequency by mechanically changing a length of an air-duct between two inside resonators. A computer-controlled, electromechanical actuator moves a cylindrical sleeve along a tube conducting air between the two inside resonators, keeping the projector in resonance at the instantaneous frequency of a swept frequency signal. The computer synthesizes the linear frequency-modulated signal, compares the phase between transmitted and reference signals, and, using a Phase-Lock Loop (PLL) system, keeps the bubble resonator frequency in resonance with the driver frequency.

This tunable bubble seismic source works reasonably well at frequencies higher than 20 Hz, but at lower frequencies turbulent losses demand large dimensions for the tunable air duct and for the whole resonator. Dimensions for a seismic source with a frequency band of 5-20 Hz will be more than the maximum limit for a standard air-gun deployment system (e.g., 4 tons). At the same time, there is a great interest and demand for much lower frequencies (e.g., down to 1 Hz). Furthermore, tunable resonance systems (e.g., high-Q tunable systems) may have many other disadvantages. For example: they may be too sensitive to towing depth and water flow fluctuations; they may have limitations on their frequency sweep rate; they may transmit only specific waveforms with a slowly changing frequency; they may need a special resonant frequency control system to keep the resonant frequency equal to the instant frequency of a transmitted signal; and they may have a large start/stop transient time.

SUMMARY

To improve all the parameters of a frequency swept, tunable, resonant, seismic source for a very low frequency band, a doubly-resonant broadband seismic source is disclosed herein. A low frequency, deep water seismic source with resonator, in the form of a pressure, gas-filled, underwater bubble or balloon, manufactured from an elastic material, is different from any known engineering solution in acoustical actuator technology. In one aspect of the present disclosure, to achieve high-efficiency, sound pressure may be emitted by a symmetrical air pump with opened cylinders, driven by an electrical linear or rotary motor. The electrical motor driver may be controlled by a computer and synchronized with digitally synthesized signal waveforms. According to various aspects, the electric motor can be a linear motor or traditional rotary motor with crank-shaft mechanics. For very high power, when harmonic content is not important, a turbo-pump with controllable proportional valves may be used. In another aspect of the present disclosure, to achieve high-efficiency, sound pressure may be emitted by an air pump, driven by an electrical linear or rotary motor, or by an air blower (turbine) with controllable vents. The electrical motor or the air blower and air vents may be controlled by a computer and synchronized with digitally synthesized signal waveforms.

According to one aspect of the present disclosure, the sound source may comprise two bubble resonators tuned permanently to two different frequencies at the edges of a frequency band. Such an aspect is like that disclosed in U.S. Pat. No. 9,383,463, the entire disclosure of which is hereby incorporated by reference herein. In one aspect, the vibrations may be excited by a piston driven by a linear or a rotary motor between the resonators. Further, the resonators may be coupled through water to form a doubly-resonant frequency response similar to those for RF coupled LC oscillators, which are widely used in a common radio-receivers. According to various aspects, a volume dimension for such an underwater seismic source may be 3-4 times smaller than for a tunable seismic source variant. In one aspect, a particular seismic source is lighter than 3 tons (fitting the requirements for air-gun replacement), emits a frequency lower than 5 Hz with a large sound pressure level, is less sensitive to depth (pressure) changes and to water flow fluctuations than tunable resonance systems, can have a frequency sweep speed faster than 5 seconds over full range, can operate without a special resonant-frequency control system, and has a very small start/stop transient time relative to tunable resonance systems. In another aspect, a particular seismic source is lighter than 4000 kg (fitting the weight and dimension requirements for air-gun replacement, within crane capacity of air-gun ship deployment systems), emits a frequency lower than 20 Hz, is less sensitive to depth (pressure) changes and to water flow fluctuations than tunable resonance systems, can have a faster frequency sweep speed than tunable resonance systems, can transmit arbitrary waveforms with a frequency-phase-amplitude modulation, can operate without a special resonant-frequency control system, and has a small start/stop transient time relative to tunable resonance systems.

A seismic sound source comprising two bubble resonators may however exhibit a few disadvantages. For example, the near field of a dual bubble resonator is the result of a complex interference between two sound pressure fields. As a result, it may be hard to locate a reference signal usable to predict a far field pressure of the source. As another example it is not easy to find a pressure inside a resonator that repeats far field of the source. As yet another example, a dual bubble resonator may need a pressure compensation system to equalize the pressure in both bubbles. As yet another example, the dual bubble structure may not be stable during towing (e.g., with system incline, if one bubble starts rising it may expand and rise faster). As yet another example, the dual bubble resonator may be sensitive to depth (e.g., dual resonant frequency response differently depends from pressure in different resonators). In yet another example, a dual bubble resonator may be less efficient in an ultra-low frequency bandwidth (e.g., when frequency is lower than both resonances, the sound from both bubbles may be subtracting and may result in fading sound pressure).

A doubly-resonant single aperture (single bubble) broadband seismic source is disclosed herein to improve the parameters of a doubly-resonant seismic source with two bubble resonators. In various aspects, the single bubble seismic source of the present disclosure may be less sensitive to depth, may have a predictable near field, may raise power at low frequencies, may have a simplified pressure compensation system, may make towing stable, may locate a point where a reference signal can be used for far field prediction. In one aspect, the single bubble seismic source may comprise a blower or a dual piston driver. In various aspects the seismic source may comprise a bubble resonator tuned permanently to a lower frequency resonance and an internal Helmholtz resonator-mixer (hereinafter Helmholtz resonator) tuned to high frequency resonance. In one aspect, the lower frequency bubble resonator may have a membrane exposed to water and will be excited by air flow from the internal Helmholtz resonator. In various aspects, the pressure inside the bubble resonator will be proportional to radiated sound pressure in a far field. In various aspects, a signal in the far field may have high quality because the pressure inside the bubble resonator is controllable. In various aspects the internal Helmholtz resonator comprises a chamber-mixer and pipe-throat with an output to a center of the bubble resonator. In one aspect, the chamber-mixer of the Helmholtz resonator may mix air flow driven by two pistons. In such an aspect, the chamber-mixer may sum pressure from two pistons rotating with a shifted phase. A phase shift between piston rotations may determine the amplitude of a result signal in the chamber-mixer. Further, in such an aspect, a negative feedback from the chamber mixer (e.g., from a pressure sensor) to motor drivers associated with the two pistons may minimize high frequency harmonics distortions. In another aspect, the chamber-mixer of the Helmholtz resonator may mix air flow driven by a blower through two controllable air vents. In such an aspect, the chamber-mixer may sum air flow through an air vent associated with a high-pressure accumulator cavity and an air vent associated with a lower pressure accumulator cavity. In such an aspect a continuously rotating blower may create a difference in pressure between the high-pressure accumulator cavity and the lower pressure accumulator cavity. The controllable air vents may be controlled by voice coils similar to an electro-magnetic load speaker to emit an arbitrary waveform of sound pressure. Further, in such an aspect, a negative feedback from a pressure sensor inside the chamber-mixer may make the signal proportional to the digitally generated input signal.

In various aspects, the resonant bubble seismic source of the present disclosure may have a Q factor in shallow water that is more than 10 and its frequency band may be narrow.

One aspect of the present disclosure includes a sound source comprising a first gas filled underwater resonator, a second gas filled underwater resonator connected to the first resonator, wherein the second resonator comprises a Helmholtz resonator, and at least one excitation member configured to excite the first resonator and the second resonator. In such an aspect, the first resonator is permanently tuned to produce a first resonant frequency upon excitation by the at least one excitation member and the second resonator is permanently tuned to produce a second resonant frequency upon excitation by the at least one excitation member. Further in such an aspect, the first resonant frequency is different from the second resonant frequency.

Another aspect of the present disclosure includes a sound source comprising a first gas filled resonator, wherein the first resonator comprises a bubble resonator, a second gas filled resonator connected to the first resonator, wherein the second resonator comprises a Helmholtz resonator, and at least one excitation member configured to excite the first resonator and the second resonator. In one aspect, the at least one excitation member is configured to excite the second resonator directly and then the first resonator through an air duct between the second resonator and the first resonator. In various aspects, the first resonator is permanently tuned, via an inelastic structure surrounding at least a portion of the first resonator, to produce a first resonant frequency upon excitation by the at least one excitation member and the second resonator is configured to produce a second resonant frequency upon excitation by the at least one excitation member. Further in such an aspect, the first resonant frequency is different from the second resonant frequency.

Goals of the various aspects disclosed herein include making a sound source smaller, cheaper, more reliable and more powerful than any known device. In addition, the sound source may be suitable for arbitrary waveform transmissions and may have a lower manufacturing cost than current devices. The doubly-resonant single aperture (single bubble) broadband seismic source of the present disclosure produces a higher quality of signal because of its predictable and controllable far field signal (e.g., the far field signal will be proportional to internal bubble pressure, which will have very high quality because of a negative feedback in a control amplifier). The single bubble seismic source radiates a lower frequency with a larger power, is less sensitive to depth and water flow fluctuations, is stable in the water, is easy to deploy and tow, has a simple and reliable pressure compensations system, and is low cost.

FIGURES

Various features of the aspects described herein are set forth with particularity in the appended claims. The various aspects, however, both as to organization and methods of operation, together with advantages thereof, may be understood in accordance with the following description taken in conjunction with the accompanying drawings as follows:

FIG. 15 is a diagram of a dual-resonant broadband seismic source comprising a single bubble resonator with a dual motor driver according to an aspect of the present disclosure.

FIG. 16 is a diagram of a dual-resonant broadband seismic source comprising a single bubble resonator with a turbo blower driver according to another aspect of the present disclosure.

FIGS. 25A-25B illustrate an experimental design of a medium power dual resonance single aperture sound source according to an aspect of the present disclosure.

DESCRIPTION

Figure 1:
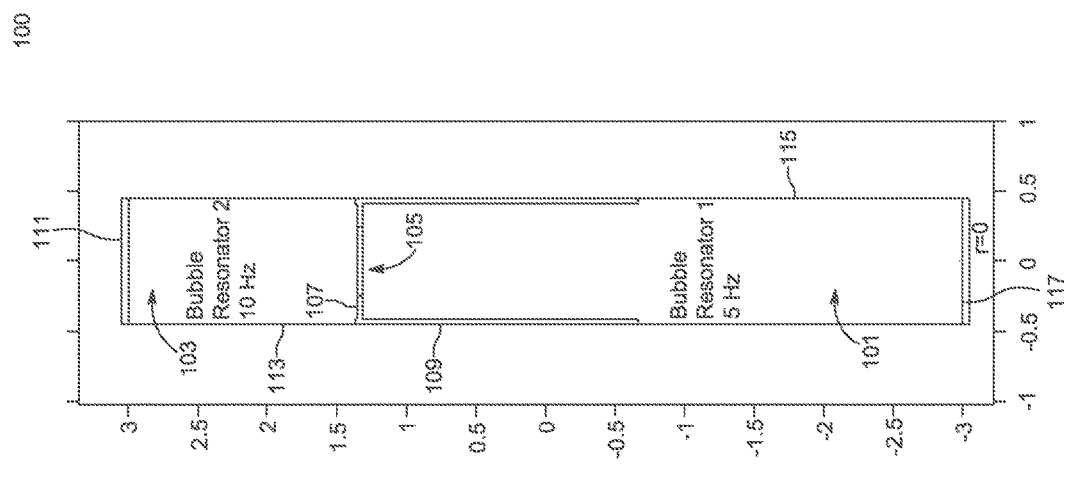
FIG. 1 is a diagram of a doubly-resonant broadband seismic source comprising two bubble resonators according to an aspect of the present disclosure.

There is a growing demand for a very low frequency sound source with a frequency range of 5-20 Hz. Applications for such a sound source include Arctic under-ice acoustic far-range navigation and communications, deep bottom penetration seismo-acoustic profiling, and long-range ocean acoustic tomography. Mostly, such applications require a high efficiency broadband source at a reasonable cost. Here, a bubble transducer has the potential for highly efficient performance of up to 10-20%. Modern technology allows us to revise the preliminary tests with the bubble source and it suggests a much more efficient engineering solution.

A differential equation for bubble oscillations is known:

$$\frac{d^2p}{dt^2} + \frac{\omega_r}{Q}\frac{dp}{dt} + \omega_r^2 = \frac{P_0}{V_0}\frac{dV_a}{dt}; \text{ and}$$

-continued $$\frac{\omega_r}{Q} = \frac{\gamma P_0 S_0}{V_0 \rho c} = \omega_r k_r a;$$

Where $$\omega_r^2 = \frac{\gamma P_0 S_0}{V_0 \rho a}$$

is the resonance frequency of the spherical bubble with the radius a volume $V_0 = (4/3)\pi a^3$, and pressure $P_0$; $\gamma$ is the ratio of the specific heats at constant pressure to specific heat at constant volume for gas within the bubble; $k_r = \omega_r/c$ is the resonance wave number; and $Q = 1/(k_r a)$ is the Q-factor.

To cover a large frequency band, a sound source can be tuned by mechanically changing a length of an air-duct between two inside resonators (e.g., U.S. Pat. No. 8,634,276, referenced above). Such a tuneable variant of the bubble seismic source may work at frequencies higher than 20 Hz, but at lower frequencies turbulent friction losses demand large dimensions for a tuneable air duct and for the resonator as a whole. The volume of the source for a frequency band 5-20 Hz may be as large as 12 cubic meters. Such a large tuneable resonance source may be too sensitive to depth and water flow fluctuations, and it may transmit only specific waveforms with a limited frequency rate. A special tracking controller may also be required to keep the resonance frequency equal to an instant frequency of signal.

Dual-Resonant Broadband Seismic Source Comprising Dual Bubble Resonators

According to one aspect of the present disclosure, a sound source comprises a first gas filled underwater resonator, a second gas filled underwater resonator connected to the first resonator and at least one excitation member configured to excite the first gas filled underwater resonator and the second gas filled underwater resonator. The first gas filled underwater resonator is permanently tuned to produce a first resonant frequency upon excitation by the at least one excitation member and the second gas filled underwater resonator is permanently tuned to produce a second resonant frequency upon excitation by the at least one excitation member. The first resonant frequency is different from the second resonant frequency. According to one aspect, at least one of the first resonant frequency and the second resonant frequency is within a range of 5-20 Hz. In another aspect, both the first resonant frequency and the second resonant frequency are within a range of 5-20 Hz.

A doubly-resonant broadband seismic source according to the present disclosure may provide a sound source that smaller, cheaper, more reliable and more powerful than any known prototype. In addition, a doubly-resonant broadband seismic source according to the present disclosure may be suitable for arbitrary waveform transmissions and may have lower manufacturing costs. According to one aspect of the present disclosure, a doubly-resonant broadband seismic source may comprise two/dual bubble resonators, tuned permanently to two different frequencies at the edges of a frequency band. Vibrations may be excited by a piston, which may be driven by a linear or rotary motor between the dual resonators. The dual resonators may be coupled through the water and may have a doubly-resonant frequency response, similar to coupled LC oscillators, which are widely used in radio-receivers. The volume of the underwater seismic source may be 3-4 times smaller than the volume for a tuneable bubble seismic source. Additionally, a doubly-resonant broadband seismic source may meet the limitations to weight and dimension required for air-gun replacements for a 5-20 Hz band, and/or for a frequency lower than 5 Hz. According to various aspects, a doubly-resonant broadband seismic source may be less sensitive to depth and water flow fluctuations than a tuneable bubble seismic source. Additionally, a rate of a frequency sweep of the doubly-resonant broadband seismic source may be faster than a tuneable bubble seismic source, and the doubly-resonant broadband seismic source may be able transmit waveforms with an arbitrary frequency-phase-amplitude modulation. Further, in various aspects of the present disclosure, the doubly-resonant broadband seismic source may not require a special resonant frequency control system (e.g., a phase lock loop (PLL) controller) and may have a small start/stop transient time compared to a tuneable bubble seismic source.

FIG. 1 illustrates an aspect of a doubly-resonant broadband seismic sound source 100 comprising dual bubble resonators according to on aspect of the present disclosure. All dimensions indicated in FIG. 1 are in meters. In FIG. 1, the sound source 100 comprises a first gas filled underwater resonator 101, a second gas filled underwater resonator 103 connected to the first resonator 101 and at least one excitation member 105 configured to excite the first gas filled underwater resonator 101 and the second gas filled underwater resonator 103. The gas that fills the resonators may be any gas that functions appropriately in the environment that the doubly-resonant broadband seismic sound source 100 is to be deployed. For example, the gas may be normal air, oxygen, nitrogen, carbon dioxide, etc. along with any combinations as appropriate.

According to various aspects, the first and second resonators 101, 103 may be underwater bubble cylindrical resonators. Each of the resonators 101, 103 may comprise inelastic edges and elastic cylindrical walls under internal pressure. As shown in FIG. 1, the resonators 101, 103 may each comprise a membrane 113, 115 with a metal end cap 111, 117. The metal end cap 111, 117 may comprise aluminium. While the shape of the resonators 101, 103 is shown and described as cylindrical, the resonators 101, 103 may be sized and configured as appropriate and the entirety or a portion thereof may include for example, a tubular shape, a square or rectangular shape, a spherical shape, etc. Additionally, the first resonator and/or the second resonator may comprise a bubble cylindrical resonator. According to various aspects, the first resonator 101 may be permanently tuned to produce a first resonant frequency upon excitation by the excitation member 105 and the second resonator 103 may permanently tuned to produce a second resonant frequency upon excitation by the excitation member 105. The first resonant frequency may be different from the second resonant frequency.

The excitation member 105 may be configured to excite the first resonator 101 and the second resonator 103 by changing a volume of the interior chamber of the first resonator 101 and by changing a volume of the interior chamber of the second resonator 103. Additionally, the excitation member 105 may be configured to excite the first resonator 101 and the second gas filled resonator sequentially. In another aspect, the excitation member 105 may be configured to move between an interior chamber of the first resonator 101 and an interior chamber of the second resonator 103 in opposite directions. According to various aspects, the excitation member 105 may comprise at least one piston and at least one motor, where the at least one piston is driven by the at least one motor. Additionally, the at least one motor may be located between the first resonator 101 and the second resonator 103. The excitation member may be configured to excite the first resonator 101 and/or the second resonator 103 by changing a volume of an interior chamber of the first resonator 101 and/or a volume of an interior chamber of the second resonator 103.

Figure 11:
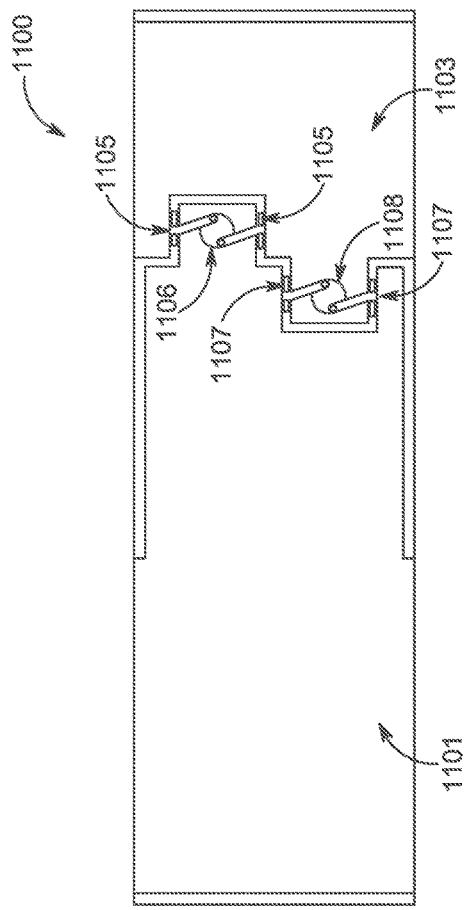
FIG. 11 is a diagram of a doubly-resonant broadband seismic source comprising two bubble resonators according to an aspect of the present disclosure.

Additionally, the at least one motor may comprise a rotary motor and/or a linear motor and the excitation member 105 may be configured to control an amplitude of sound emitted by the sound source 100 based on a stroke displacement of the at least one linear motor and/or based on a difference of rotation phase of at least two rotary motors (e.g., FIG. 11). In another aspect, the excitation member 105 may comprise a regenerative rotary blower and two gas-accumulating tanks connected with two valves between the tanks and the first resonator 101 and two valves between the tanks the second resonator 103 such that the valves are configured to open and close to create a pressure pulse and gas exhaust in both resonators similar to the effect of a moving piston (e.g., FIG. 12). According to additional aspects, the excitation member 105 may comprise any or all aspects of the motor and valves as discussed above, alone and/or in combination.

As shown in FIG. 1, the two resonators 101, 103 comprise solid material edges and elastic membrane cylindrical walls under internal pressure. In one embodiment, the edges of the resonators may be made of metal, such as for example, aluminium. The resonators 101, 103 are shown as being separated by a wall 107 with the excitation member 105 as a moving piston in the middle. The piston may be configured to move through an aperture of the wall 107 to excite at least one of the first resonator 101 and/or the second resonator 103. The wall 107 may be a connection between the resonators 101, 103. The resonance frequency of each resonator 101, 103 is shown as 5 Hz and 10 Hz, respectively. According to various aspects, the resonance frequency $f_r$ of each resonator may be within a range of 5-10 Hz and may be proportional to the square root of the ratio of the surface area $S_0$ of the membrane to the internal volume $V_0$:

$$f_r \sim \sqrt{\frac{S_0}{V_0}}.$$

To obtain a desired resonant frequency of the resonators 101, 103, an inelastic structure/device, for in example in the form of a tube, may surround at least a portion of one of the first resonator 101 and/or the second resonator 103. Referring to FIG. 1, to make a resonance frequency of the resonator 101 lower than the resonator 103, the membrane portion or bubble of the resonator 101 may be partly covered by a metal cylinder 109, which may be comprised of, for example, aluminum. It is important to note that even when the pressure changes, a ratio between the frequencies of the resonators 101, 103 may remain constant. As shown in FIG. 1, the wall 107 separating the resonators 101, 103 has a hole with a moving piston 105 in it. In FIG. 1, the excitation member 105 is located in the middle of the wall 107; however, in other aspects the excitation member 105 may be located off-center. The piston 105 operates to change the volume in the resonators 101, 103 in an opposite fashion such that when the volume in the resonator 103 is increasing, the volume in the resonator 101 is decreasing. In an alternative aspect, the excitation member 105 may comprise a regenerative rotary turbo-compressor, two gas-accumulating tanks and four electrically controlled proportional valves to create a pressure impulse and gas exhaust synchronically inside the resonators 101, 103 in a way similar to a moving piston effect.

Figure 2A:
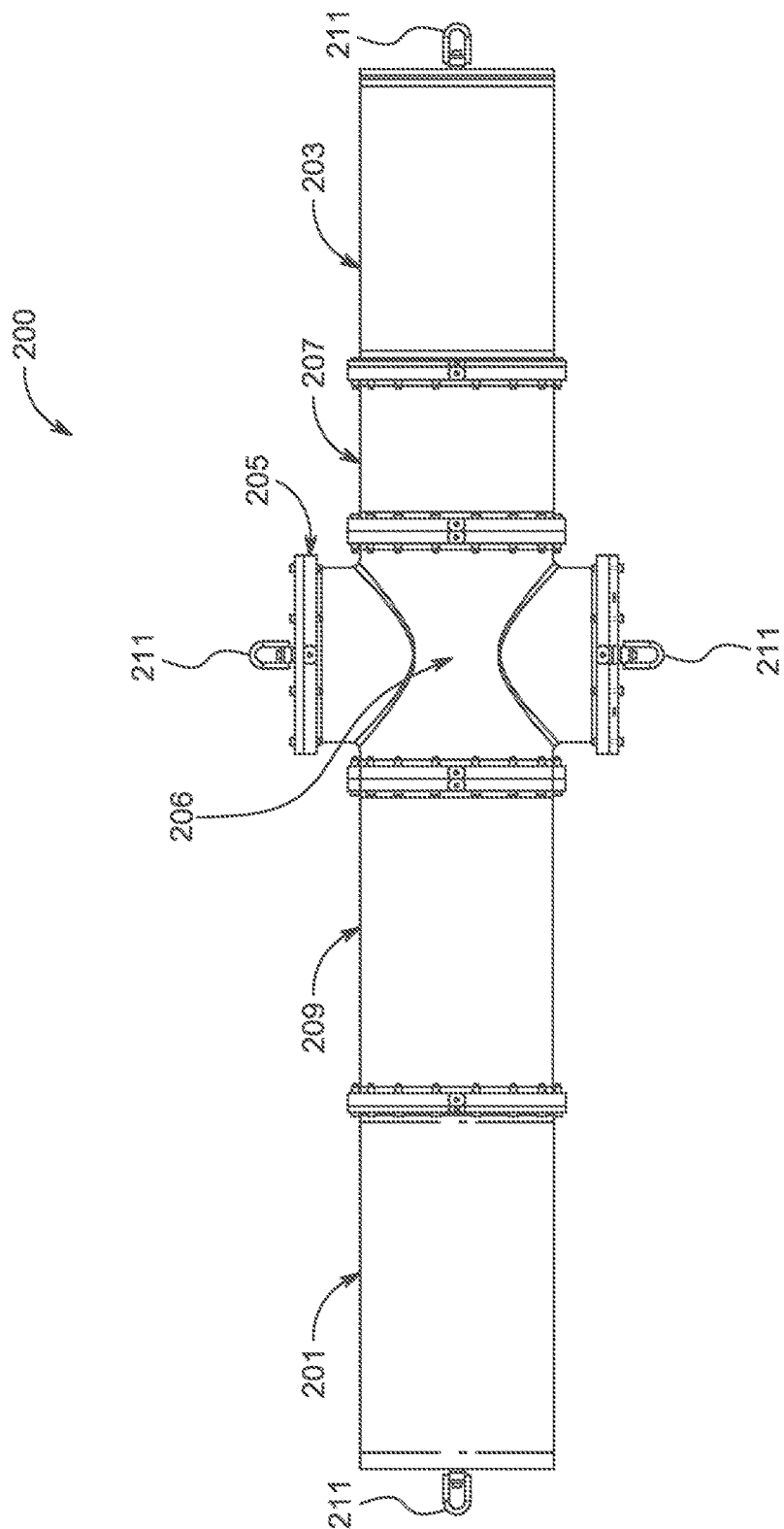
FIGS. 2A-2C are diagrams of a doubly-resonant broadband seismic source according to another aspect of the present disclosure.
Figure 2B:
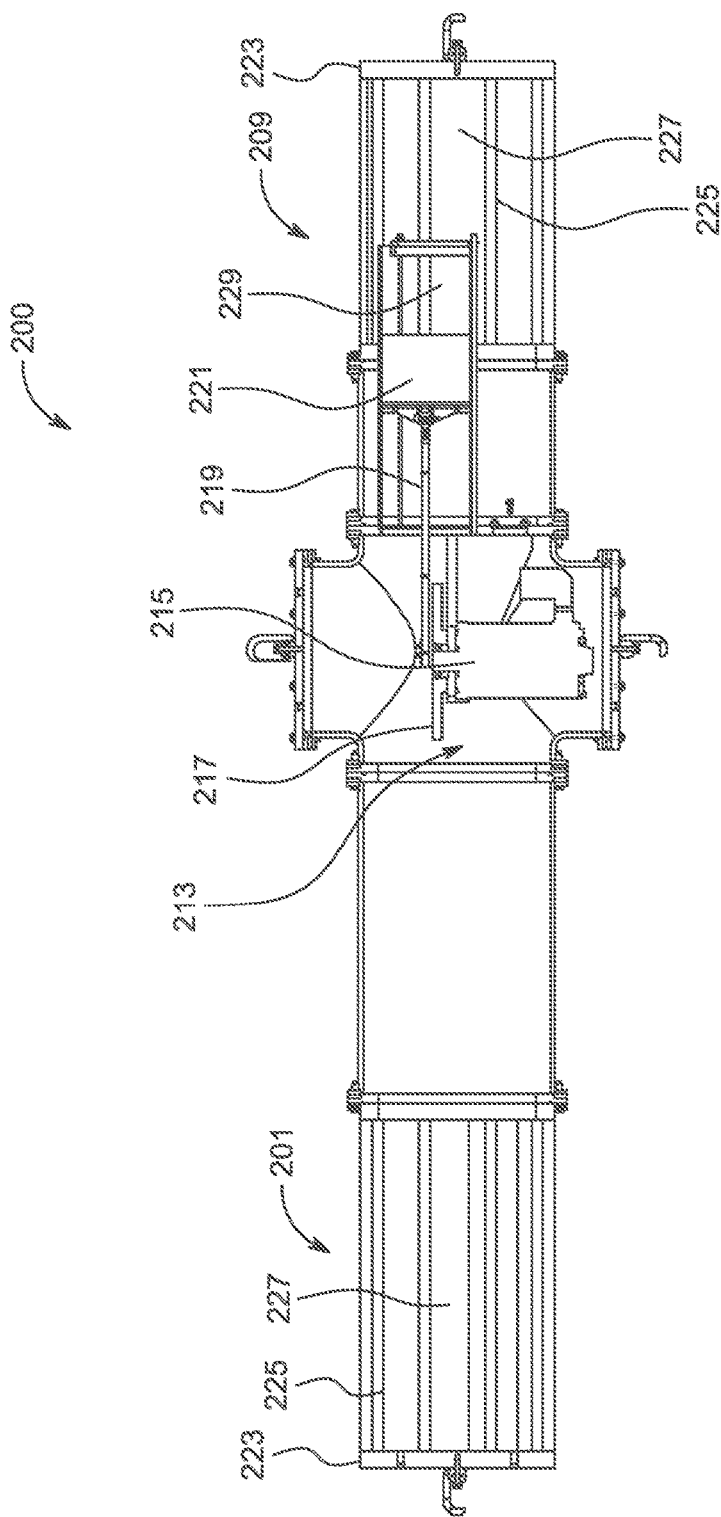
Figure 2C:
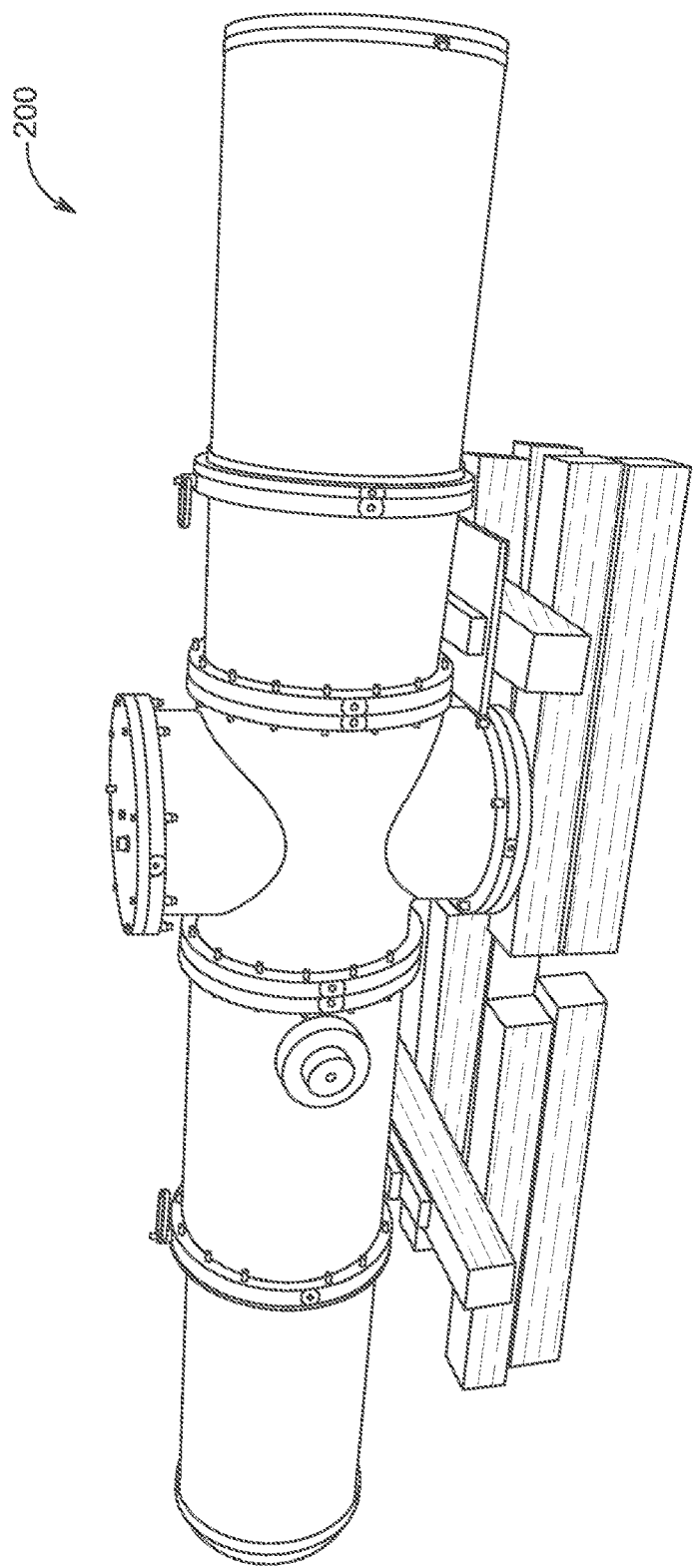

FIGS. 2A-2C illustrate a doubly-resonant broadband seismic sound source 200 comprising dual bubble resonators according to another aspect of the present disclosure. The sound source 200 comprises a high-frequency bubble resonator 201 that has a rubber membrane 227, a tubular hall 209 for the high-frequency bubble resonator 201, a motor section housing 206, an endcap 205 for the access to the motor section that includes the excitation member 213, a tubular hall 207 for a low-frequency resonator 203, and the low-frequency bubble resonator 203 has a rubber membrane 227. Loading or towing connections 211 may be provided at appropriate locations on the doubly-resonant broadband seismic sound source 200. In addition, each tubular hall 209, 207 may comprise aluminum or other solid rigid material, such as metal, composite carbon-fiber or fiber-glass, glass, ceramic, etc. along with combination thereof.

Each resonator 201, 203 may comprise rods 225 that support an endcap 223 where the rods 225 are covered by the rubber membrane 227. The excitation member 213 comprises an electric motor 215, a flywheel 217, a crank-shaft 219, and a piston 221 that travels within chamber 229. Further, the rods 225 and endcaps 223 may comprise a metal, such as steel, aluminum, or any other material that provides sufficient rigidity where necessary. Referring to FIG. 2C, the doubly-resonant broadband seismic sound source 200 has dimensions of 0.56 m in diameter, 4 m in length, and a weight of 1232 kg.

Figure 3:
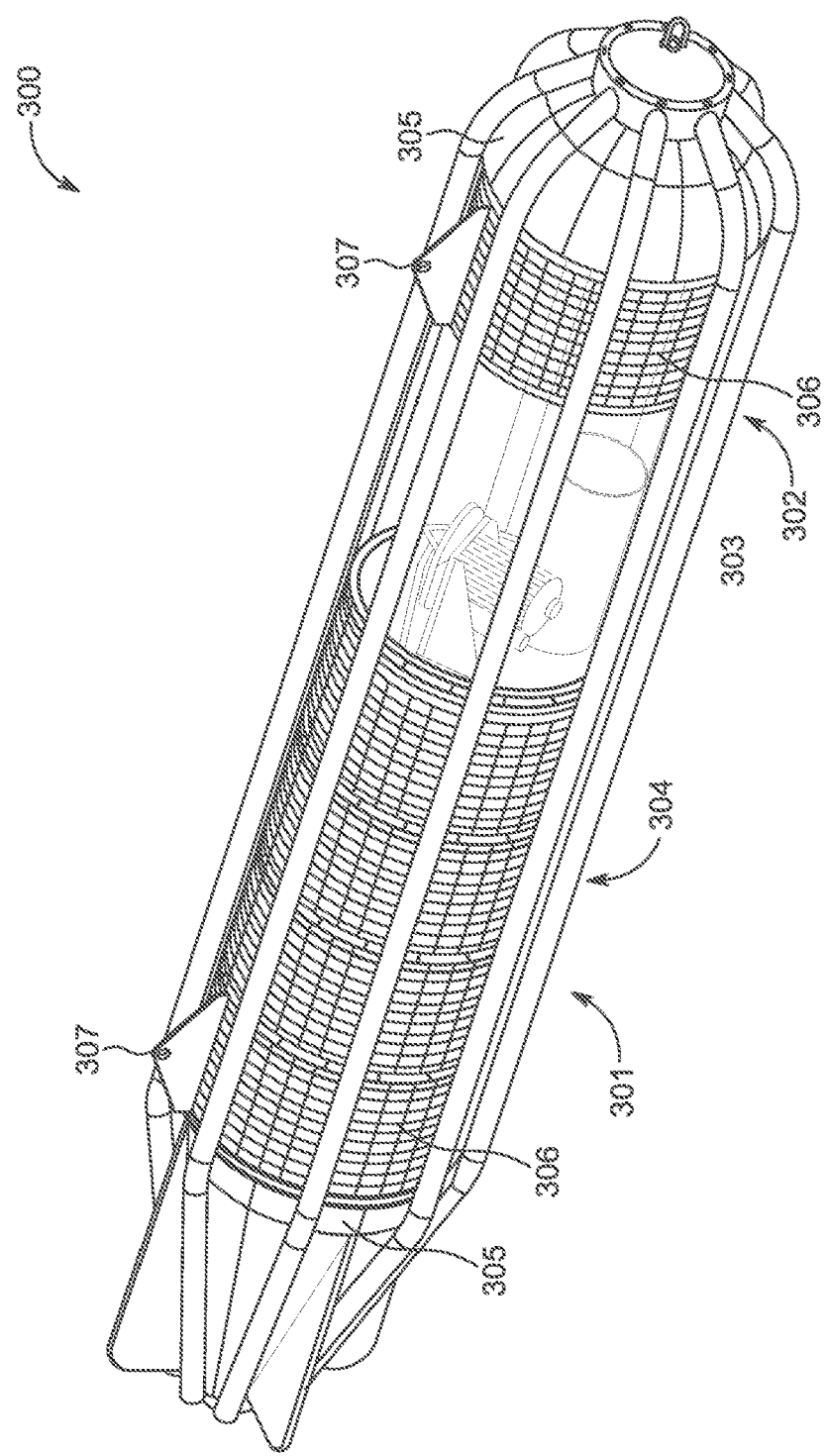
FIG. 3 is a diagram of a doubly-resonant broadband seismic source according to another aspect of the present disclosure.

FIG. 3 provides an exterior view of a doubly-resonant broadband seismic sound source 300 comprising dual bubble resonators according to another aspect of the present disclosure. As shown, the doubly-resonant broadband seismic sound source 300 comprises a first, low frequency, resonator 301, a second, high frequency, resonator 302, a motor section 303, and a cage or frame 304. Each of the first resonator 301 and the second resonator 302 has an endcap 305 and a membrane 306 that is on an exterior surface of each resonator 301, 302. The endcap 305 may comprise fins or other structures to allow the doubly-resonant broadband seismic sound source 300 to be towed through water in a controlled fashion. The frame 304 may also comprise at least one loading or towing connections 307. The frame 304 may be configured to enclose the entire the sound source 300 and is sized and configured to allow for proper towing during use and also to protect the sound source 300 from impact.

Figure 4:
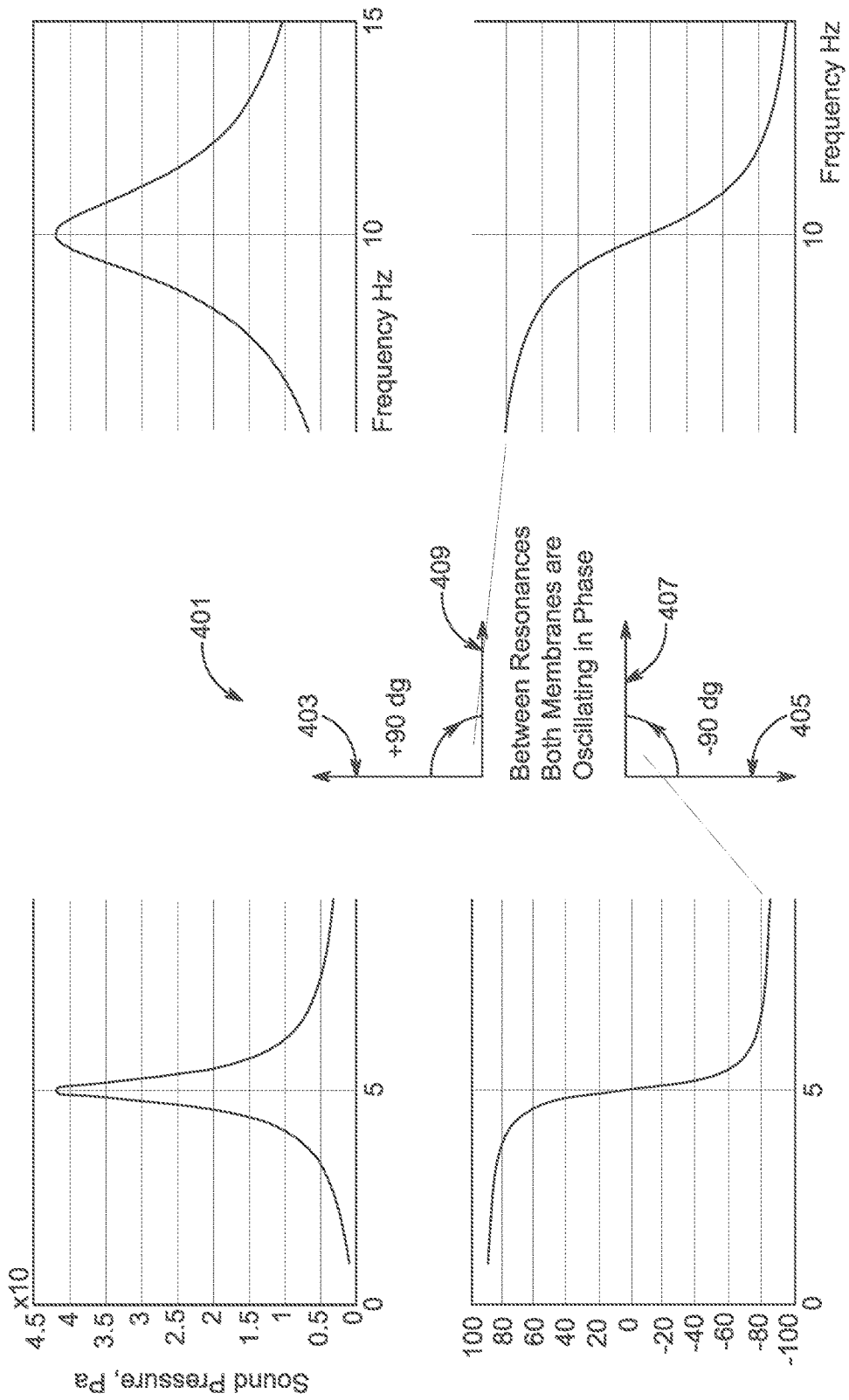
FIG. 4 is a graphical illustration of the frequency response of the doubly-resonant broadband seismic source comprising two bubble resonators shown in FIG. 1.

FIG. 4 provides graphical illustrations of the physical principles of the doubly-resonant broadband seismic sound source 100 of FIG. 1. In the vector diagram 401 of FIG. 4, the operation of the piston 105 is shown by referencing the two vertical vectors, 403 and 405, which are turned on 180 degrees relative each other. The volume velocity from the resonator 101 is 403 and is pointing up; the volume velocity from the resonator 103 is 405 and is pointing down.

Referring back to FIG. 1, if the frequency is changing from low to high, the bottom lower frequency resonator 101 will dominate at the beginning and the top higher frequency resonator 103 will sound louder at the end. As shown in the vector diagram 401 of FIG. 4, in the middle of the transmission both resonators 101, 103 will vibrate mostly in phase. Indeed, if the frequency of vibration of the sound source is higher than its resonant frequency, the phase of the sound pressure will be shifted on −90 degrees or counter clockwise and will point to the right as indicated by vector 407 for the pressure in the low frequency first resonator 101. If the frequency of vibration of the sound source is lower than its resonant frequency, then the phase will be +90 degrees and the vector 403 will rotate clockwise as seen in the vector 409 for the high frequency resonator 103. As a result, sound pressure in the middle of the frequency range in both resonators will generally have the same phase. According, if the resonators 101, 103 are in the middle of frequency range, they will be vibrating in phase and efficiently radiating sound.

A COMSOL finite element analysis confirmation of the doubly-resonant seismic source physics is shown in FIGS. 5A-5D with reference to the sound source 100 of FIG. 1.

Figure 5A:
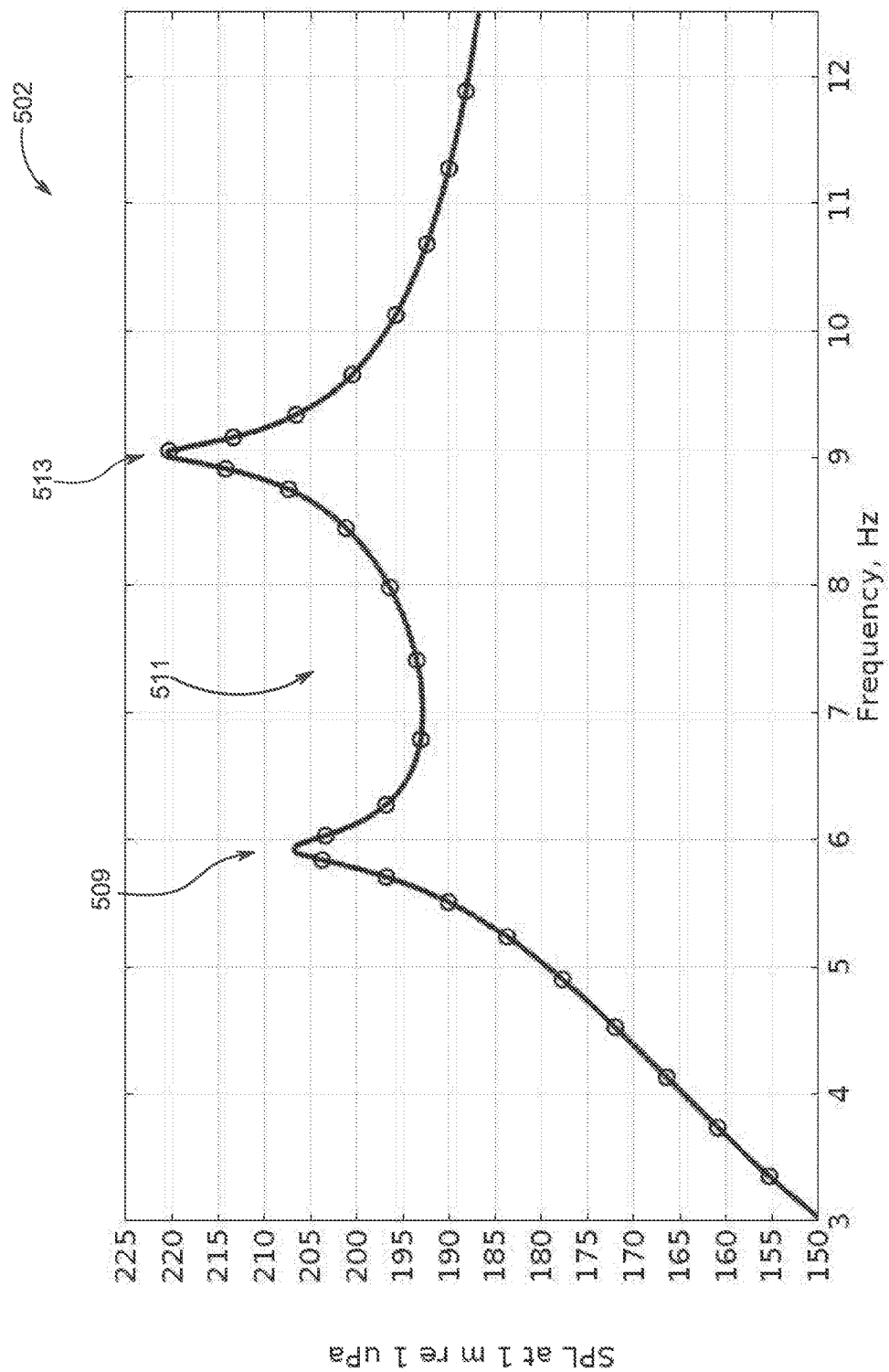
FIG. 5A is a graph of the sound pressure level of a doubly-resonant broadband seismic source comprising two bubble resonators according to an aspect of the present disclosure.

FIG. 5A is a graph 502 of the frequency response of sound source 500 (e.g., sound source 100 of FIG. 1), which has a frequency band of 5-10 Hz. The graph 502 shows two maxima 509, 513 that correspond to the resonant frequencies of the resonators 501, 503, respectively. A local minima 511 is also shown.

Figure 5B:
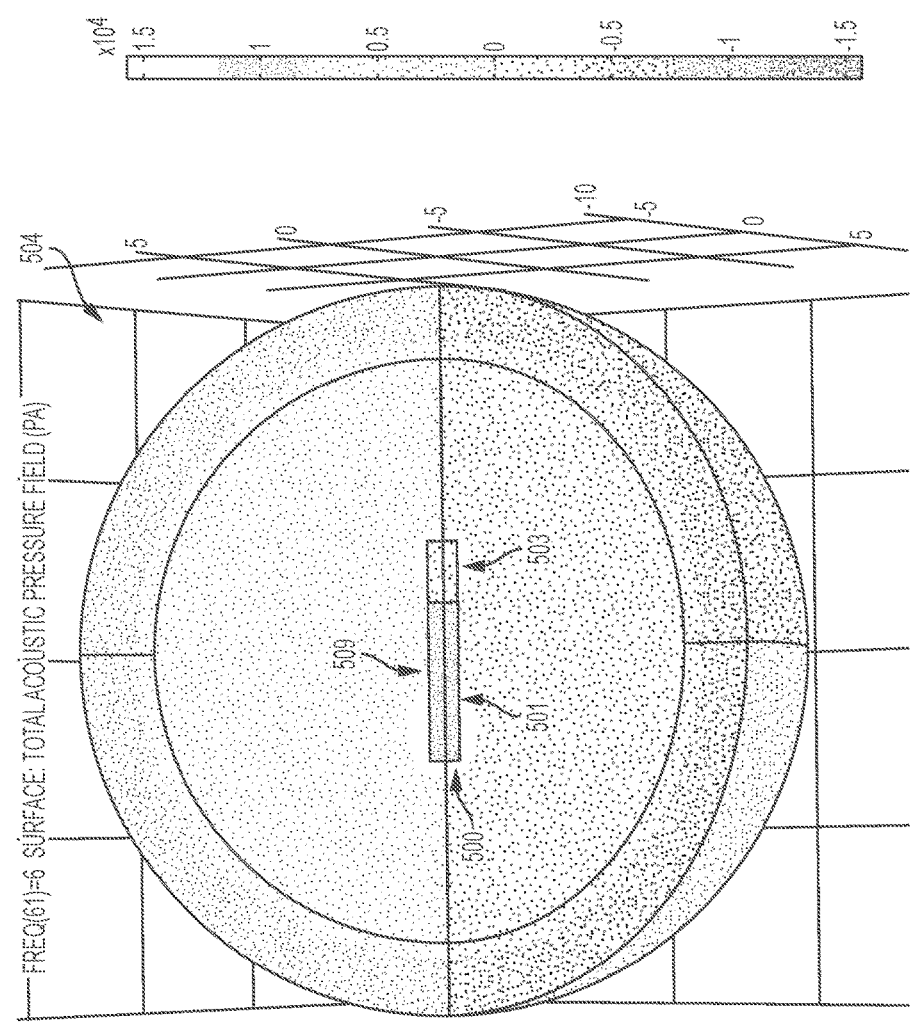
FIGS. 5B-5D illustrate a finite-element analysis of a doubly-resonant broadband seismic source comprising two bubble resonators according to an aspect of the present disclosure.

FIG. 5B is a diagram 504 of the total acoustic pressure field exerted on the surfaces of the resonators 501, 503 of the sound source 500 at the frequency (e.g., about 6 Hz) corresponding to the maxima 509 shown in FIG. 5A. As seen in FIG. 5B, the low frequency resonator 501 experiences greater pressure than the high frequency resonator 503 and the pressure is approximately $1.5 \times 10^4$ Pa.

Figure 5C:
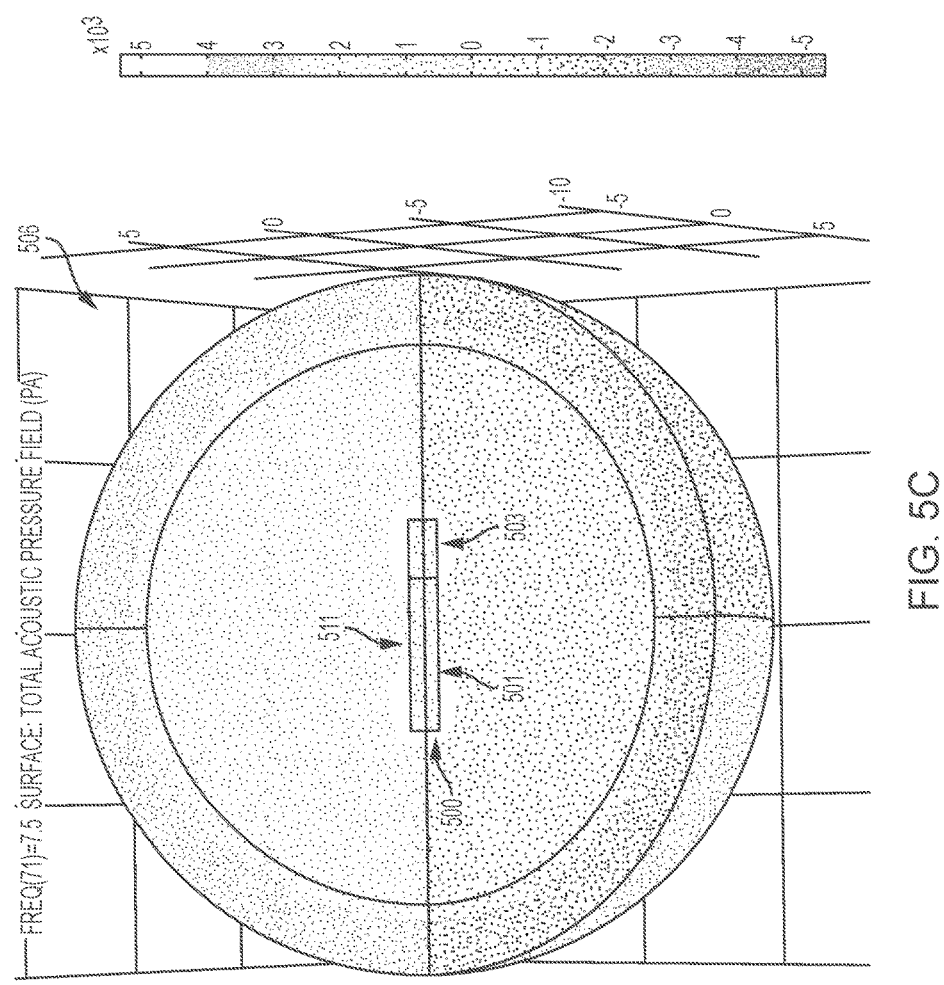

FIG. 5C is a diagram 506 of the total acoustic pressure field exerted on the surfaces of the resonators 501, 503 of the sound source 500 at the frequency (e.g., about 6.5 Hz) between the two resonances corresponding to the minima 511 shown in FIG. 5A. As seen in FIG. 5C, the sound pressure in high frequency resonator 503 experiences the same phase as the sound pressure in the low frequency resonator 501 (shown both by light-grey) and the pressure is approximately $5 \times 10^3$ Pa. Both resonators 501, 503 are radiating in phase.

Figure 5D:
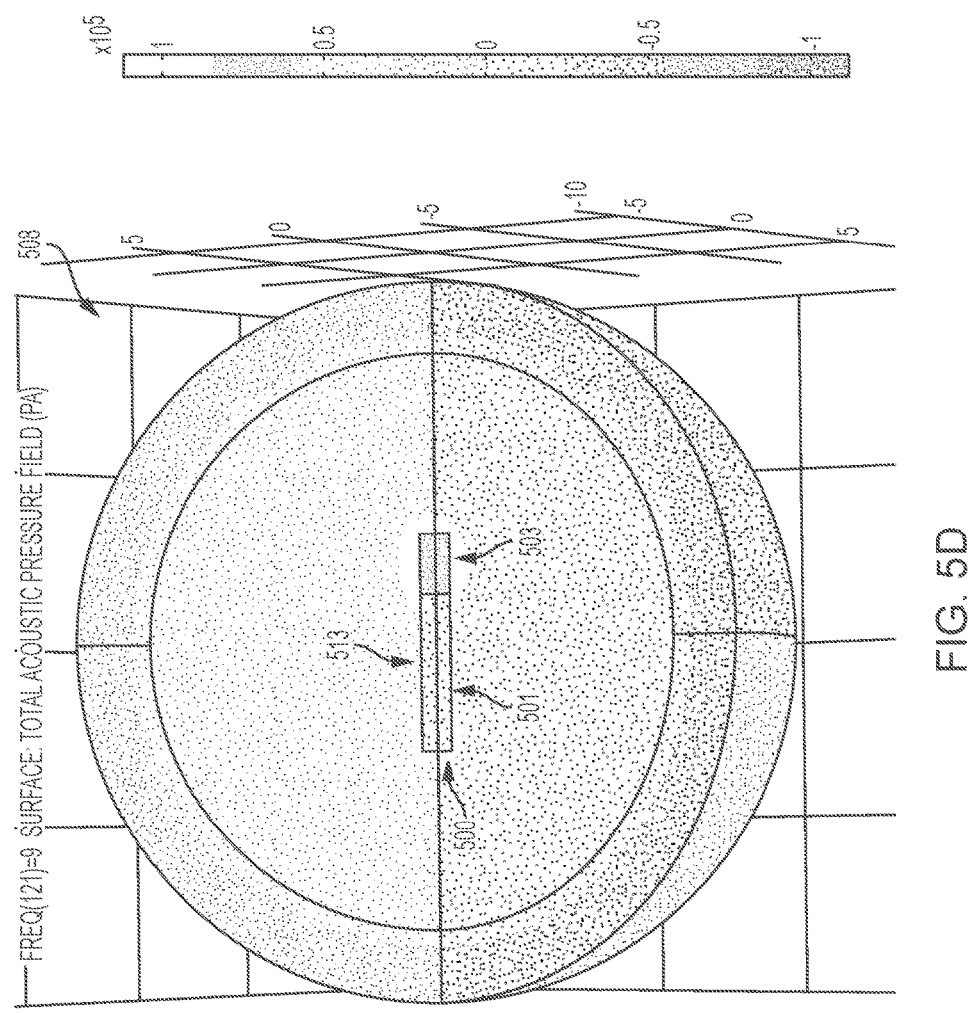

FIG. 5D is a diagram 508 of the total acoustic pressure field exerted on the surfaces of the resonators 501, 503 of the sound source 500 corresponding to the maxima 513 shown in FIG. 5A. As seen in FIG. 5D, the high frequency resonator 503 experiences greater pressure than the low frequency resonator 501 and the pressure is approximately $1.0 \times 10^5$ Pa.

Figure 6:
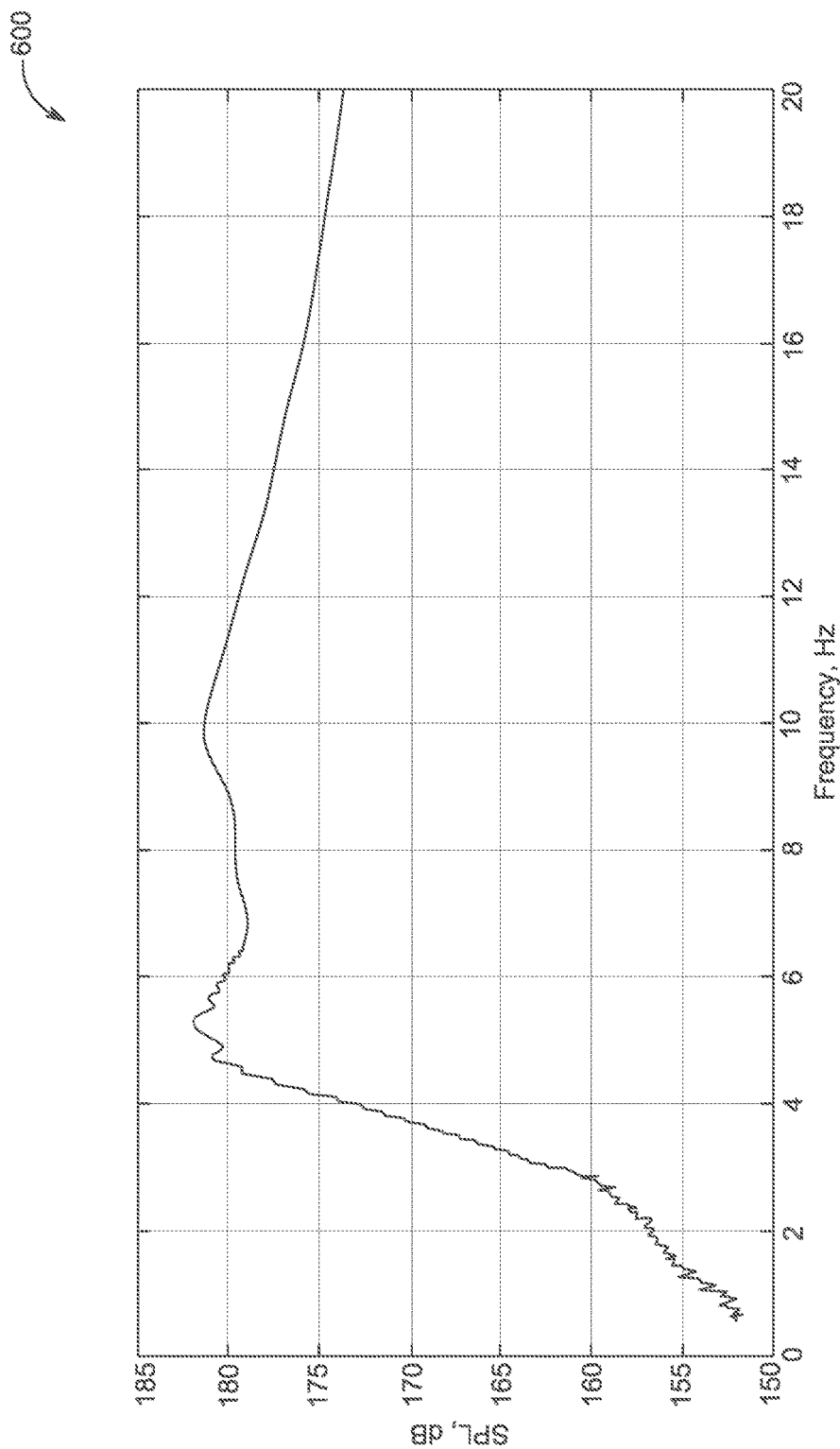
FIG. 6 is a graph of the dependence of pressure inside a doubly-resonant broadband seismic sound source comprising two bubble resonators according to an aspect of the present disclosure.

FIG. 6 is a graph 600 of the experimental frequency response of sound source 600 (e.g., sound source 200 of FIG. 2C). The sound source pressure level (SPL) in a large resonator 201 had a maximum value of 182 dB. Referring to FIG. 6, the resonant frequencies of the sound source 600 are about 5 Hz and 10 Hz and the frequency response covers the total band from 5 to 20 Hz. That bandwidth is very suitable for a lower part of the frequency band or air guns used for marine geological survey.

Figure 7:
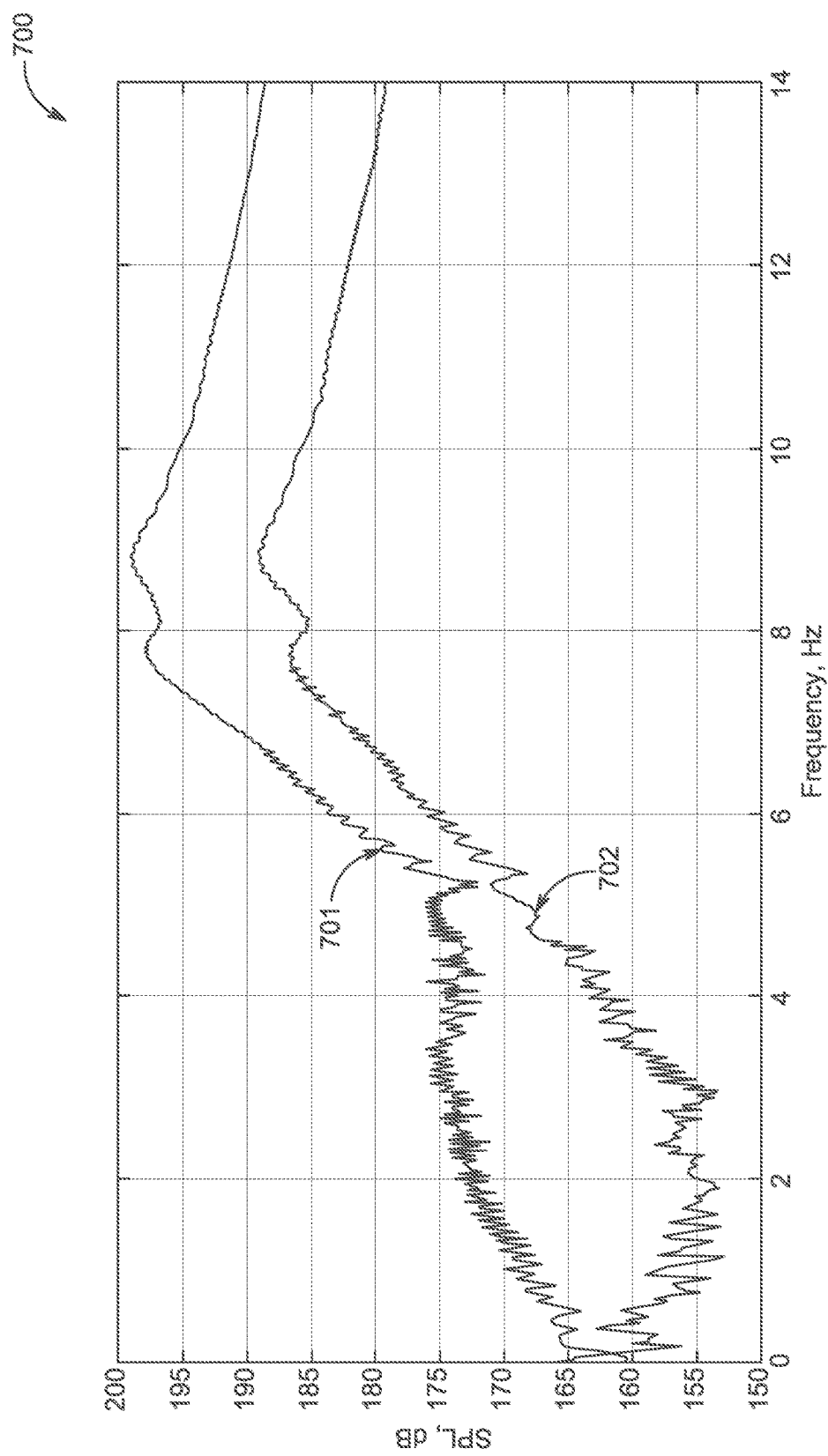
FIG. 7 is a graph of the dependence of pressure inside a doubly-resonant broadband seismic sound source comprising two bubble resonators and a sound pressure at the distance of 3 m from the sound source in water according to another aspect of the present disclosure.
Figure 8:
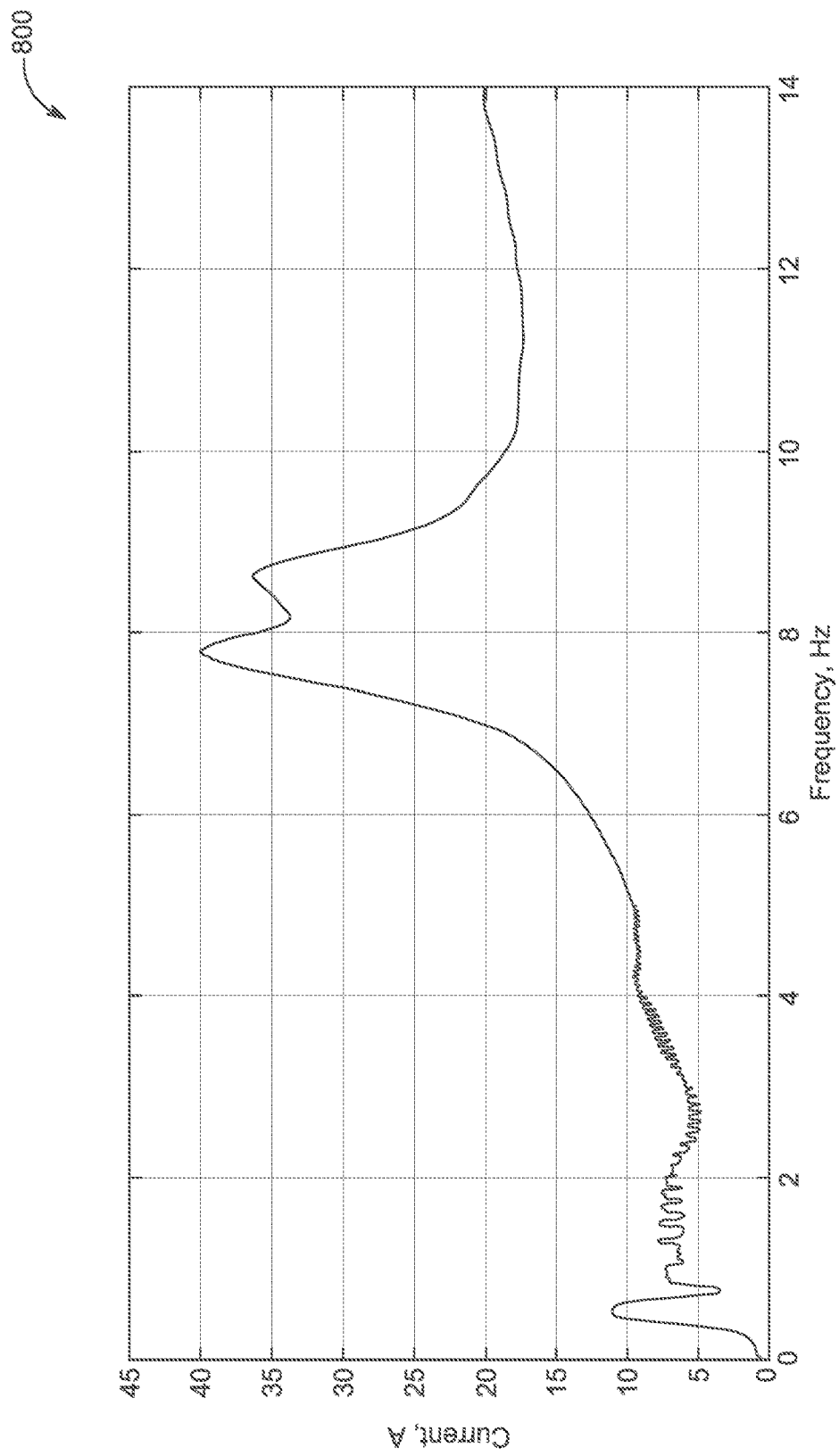
FIG. 8 is a graph of the motor current from a real world pool test of a doubly-resonant broadband seismic sound source comprising two bubble resonators according to an aspect of the present disclosure.
Figure 9:
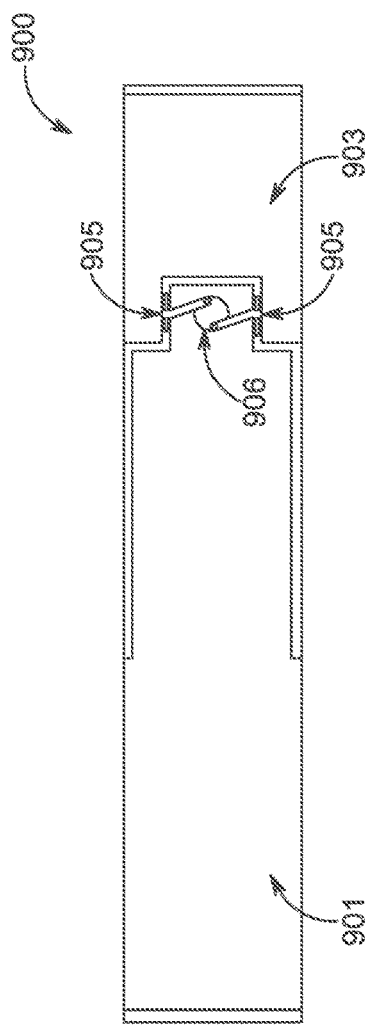
FIG. 9 is a diagram of a doubly-resonant broadband seismic source comprising two bubble resonators according to an aspect of the present disclosure.

FIGS. 7 and 8 are graphical results of the frequency response from a real world pool test of another doubly-resonant broadband seismic sound source according to the present disclosure. To change the resonant frequencies of the resonators 201, 203 of the sound source 200 of FIG. 2C, the rubber membrane sections were swapped. As a result the resonances became closer and the sound source pressure level increased. Referring to FIG. 7, the graph 700 shows Sound Pressure Level (SPL) in decibels versus Frequency in Hertz for pressure inside resonator 203 (e.g., plot 701) and pressure measured by a hydrophone 3 meters away from the source (e.g., plot 702).

As shown by plots 701 and 702 in FIG. 7, the resonant frequencies are about 7.5 Hz and 8.7 Hz. Plot 701 shows that the SPL increased (e.g. from a maximum of about 182 dB to a maximum of about 198 dB) compared with graph 600 in FIG. 6. Furthermore, the frequency bandwidth decreased (e.g. from covering about 5-20 Hz to covering 7-10 Hz) compared with graph 600 in FIG. 6.

Referring to FIG. 8, the average current running through the coils of the DC brushless motor versus frequency is shown. The current was measured for a real chirp signal when frequency was slowly changing from 0 to 14 Hz. The current follows the SPL of the sound source shown in FIG. 7, which demonstrates the high efficiency of the electro-acoustic transduction.

FIGS. 9-12 illustrate excitation members, also called acoustical drivers, of a doubly-resonant broadband seismic sound source according to various aspects of the present disclosure. In view of FIG. 9, an acoustical driver 900 may comprise pistons 905 that move in opposite directions. The acoustical driver 900 may have a symmetrical form. The pistons 905 are configured to move between the first, low frequency, resonator 901 and the second, high frequency, resonator 903 based on a rotary motor 906. The pistons 905 may move through separate apertures in a wall of the sound source 900 in opposite directions. According to various aspects, the pistons 905 may be connected to a single motor or more than one motor and may move in phase or out of phase as appropriate. An acoustical driver 900 with pistons 905 that move in opposite directions may be configured such that it avoids useless vibrations of the source as a whole and may make the sound source 900 more efficient. The first and second resonators 901, 903 may be the same or similar as other resonators as described herein.

Figure 10:
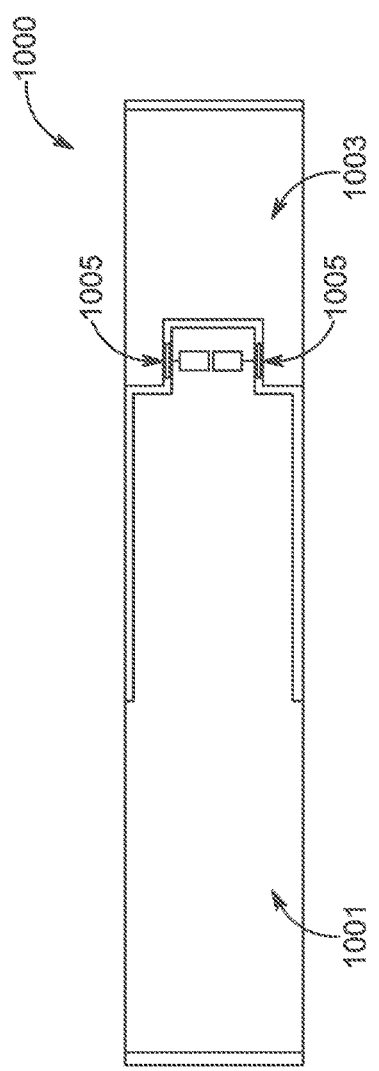
FIG. 10 is a diagram of a doubly-resonant broadband seismic source comprising two bubble resonators according to another aspect of the present disclosure.

In view of FIG. 10, an acoustical driver 1000 may comprise two linear electro-motors 1005 driving in opposite directions. The acoustical driver 1000 may have a symmetrical form. The two linear electro-motors 1005 are configured to move between the first, low frequency, resonator 1001 and the second, high frequency, resonator 1003. According to various aspects, the two linear electro-motors 1005 may move in phase or out of phase as appropriate. The linear motors 1005 may control the sound amplitude by changing a stroke displacement of the linear motors 1005. The first and second resonators 1001, 1003 may be the same or similar as other resonators as described herein.

In view of FIG. 11, an acoustical driver 1100 may comprise two sets of pistons 1105, 1107 that move in opposite directions. The acoustical driver 1100 may have a symmetrical form with two rotary motors that have a shifted phase of rotation. In another aspect, the pistons 1105, 1107 may have an asymmetrical form. The pistons 1105, 1107 are configured to move between the first, low frequency, resonator 1101 and the second, high frequency, resonator 1103 based on a rotary motors 1106, 1108, respectively. The pistons 1105 may move through separate apertures in a wall of the sound source 1100 in opposite directions and similarly, the pistons 1107 may move through yet another set of separate apertures in the wall of the sound source 1100 in opposite directions. Further, the first and second resonators 1101, 1103 may be the same or similar as other resonators as described herein. According to various aspects, the pistons 1105, 1107 may be connected to a single motor or more than one motor and may move in phase or out of phase as appropriate.

In one embodiment, the two rotary drivers 1106, 1108 may be configured to operate in parallel, such that the amplitude of the sound source is regulated by shifting a relative phase of rotation in accordance with the equation:

$$A^*\cos(\omega t+\varphi)+A^*\cos(\omega t)=B^*\cos(\omega t+\varphi/2),$$

$$B=A^*\cos(\varphi/2)$$

Figure 12:
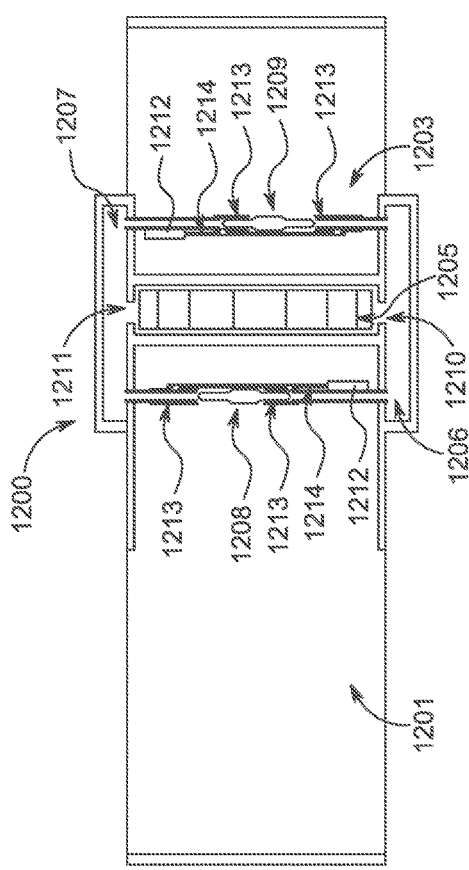
FIG. 12 is a diagram of a doubly-resonant broadband seismic source comprising two bubble resonators according to an aspect of the present disclosure.

In view of FIG. 12, an acoustical pneumatic driver 1200 may comprise a regenerative blower 1205, a low pressure gas accumulating tank 1206, a high pressure gas accumulating tank 1207, and two pairs of proportional sleeve valves 1208, 1209. The regenerative blower is attached with a low-pressure input 1210 to the tank 1206 and with its high pressure output 1211 to tank 1207. The controlled valves 1208, 1209 provide open paths for gas between resonators 1201, 1203 and gas tanks 1206, 1207. The resonator 1201 is connected by pair of valves 1208 to the low-pressure tank 1206 and to the high-pressure tank 1207. The resonator 1203 is connected with another pair 1209 of valves to the low-pressure tank 1206 and to the high-pressure tank 1207. The proportional sleeve valves 1208, 1209 shown in FIG. 12 are driven by linear actuators 1212, such as voice-coils or small-power linear motors. Each linear actuator 1212 may move the two sliding sleeves 1213, which are attached to one axis 1214, respectively.

According to one alternative aspect, a butterfly valve may be used instead, driven by a rotary actuator, such as rotary motor or rotary voice-coil, or any other type of proportional gas valve. Referring back to FIG. 12, the valves in each pair 1208, 1209 are each controlled by one actuator 1212 in an opposite way. When connected to high pressure tank 1207 valve 1209 is opening and gas is streaming into the resonator 1203, the lower pressure valve 1208 is closing. The created pressure pulse will be equivalent to rising pressure from a piston moving inside a resonator. When connected to lower pressure tank 1206 valve 1208 is opening and gas is exhausting from the resonator 1201, the high pressure valve 1209 from the pair is closing and pressure is changing similar to a piston moving out of a resonator and expanding its volume. Each pair of valves 1208, 1209, are configured to create a changing pressure inside the resonators 1201, 1203 similar to that from the moving piston.

Although a pneumatic driver may operate similar to an electrical motor with piston, such an engineering solution may have many advantages. A rotary regenerative blower driven by an electric motor may prove to be more reliable than a piston system and can run continuously without maintenance for years. Thus, it may be easier and less expensive to build, while it may also be easier to repair. According to various aspects, it may provide higher power efficiency and reliability than electric motor drivers, similar to a turbo-jet versus piston engine.

A blower system may also provide less vibrations of structure as it is very well balanced. The friction of the air in valves and ducts may be less than the friction of a piston system, and thus it may provide higher efficiency. The low power linear actuators (e.g., 1212) controlling valves (e.g., 1208, 1209) may be smaller and faster than actuators that move pistons directly and are potentially suitably for higher frequencies and for arbitrary signal waveform production. The blower system sound source can operate as underwater loud-speaker when voice-coils as linear motors are connected to a regular audio amplifier. The valve pairs (e.g. 1208, 1209) in a blower system can also be controlled independently with the control of phase shift in the signals to make sound pressure in both resonators oscillating in phase in a large frequency band. Using such a configuration may potentially allow combinations of more than two resonators and expand an operable frequency band.

Figure 13:
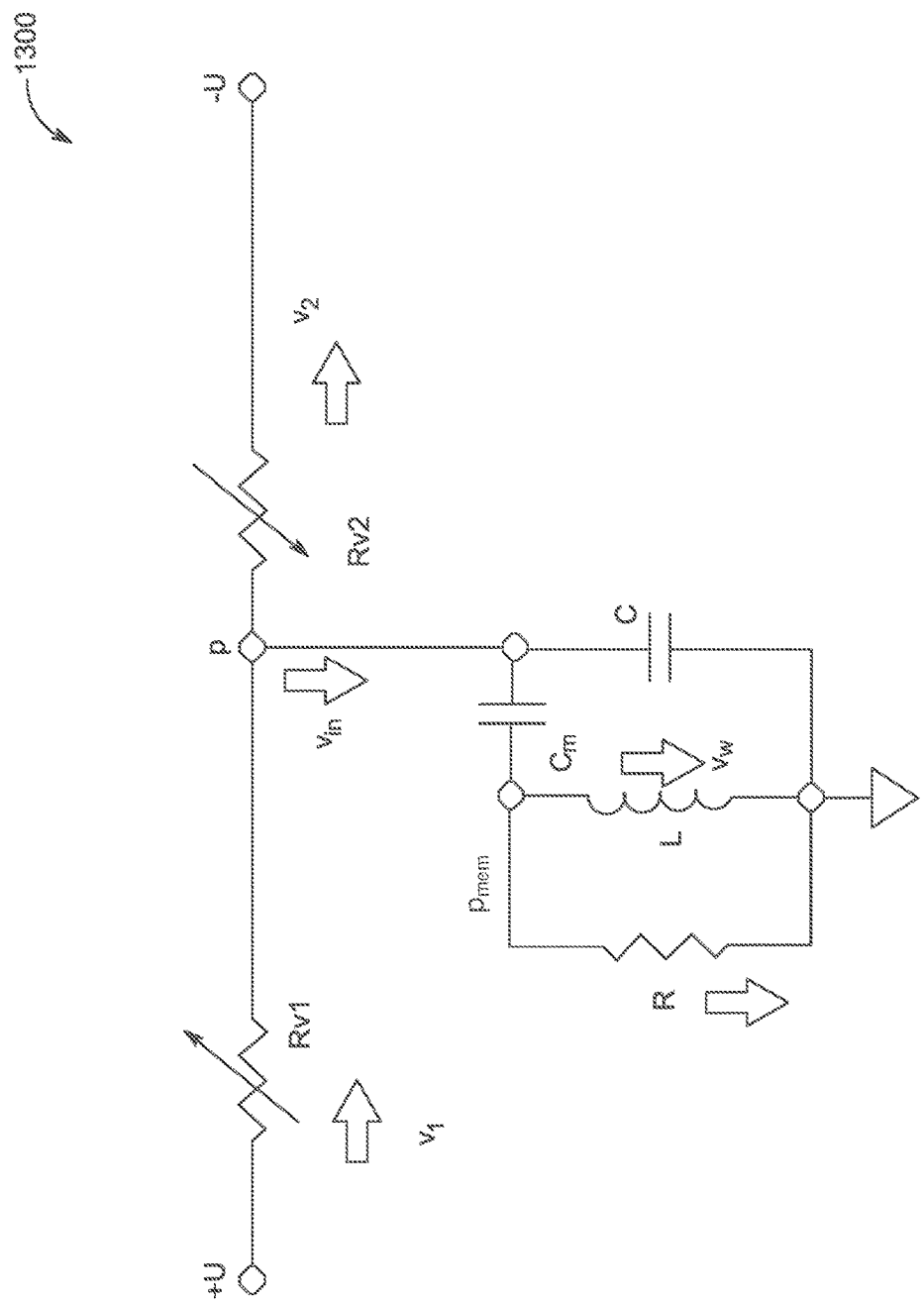
FIG. 13 is a circuit diagram for an electrical circuit for a doubly-resonant two control valve seismic source according to an aspect of the present disclosure.

Nonlinear differential equations for a dynamic model of seismic source with a blower-siren actuator as referred to in FIGS. 12 and 13 are as follows:

$$\frac{dp}{dt} = (v_1 - v_2 - v_w)\frac{\gamma P(H)}{V} - (p - p_m)\frac{\gamma P(H)S}{V\rho C} \qquad 1)$$

$$\frac{dp_m}{dt} = v_w \frac{E_{dx}}{Sa^2} + (p - p_m)\frac{E_{dx}}{\rho C a^2} \qquad 2)$$

$$\frac{dv_w}{dt} = (p - p_{mem})\frac{S}{\rho a} \qquad 3)$$

$$v_{1,2} = \sqrt{\frac{(U \pm p)A_{1,2}}{\alpha \rho_a l_{1,2}}} \qquad 4)$$

$$Pa = (p - p_{mem}) \qquad 5)$$

Where p is variable pressure in the bubble; $v_{1,2}$ are the volume velocity in the control vents 1,2; $v_w$ is the oscillating volume velocity of sound in water; Pa is the acoustical pressure on the membrane surface; γ is the ratio of specific heat at constant pressure to specific heat at constant volume; P(H) is the static bubble pressure at the depth H; V is the volume of the bubble; $p_m$ is the pressure drop on the membrane; S is the area of the membrane; ρ is the density of water; C is the water sound velocity;

$$E_{dx} = \frac{N}{\Delta dl/l},$$

where Δdl/l is the sterch, Δ is the width of a rubber belt, N is the force in Newtons; a is the radius of the bubble; U is the static pressure of blower; $A_{1,2}$ is the cross section area of the vent; α is the empiric coefficient specific for the vent design; $\rho_a$ is the density of air; and $l_{1,2}$ are the variable lengths of the valves.

FIG. 13 shows an electric circuit diagram 1300 equivalent to equations 1)-5). Where U is the voltage equal to the pressure in a gas accumulating tanks; p is the voltage equal to bubble internal pressure; p-$p_m$ is the voltage equal to external bubble (radiated) pressure; where $v_{1,2}$ are the electric currents equal to the volume velocity of gas flow from gas tanks through the controlled proportional valves; $R_{V1,2}$ are the resistors equivalent to the proportional controlled valves with the current in governed by the equation 4); $v_{in}$=$v_1$-$v_2$ is the current equal to resulting volume velocity changing in the bubble; $v_w$ is the current equal to the oscillation fraction of bubble volume velocity;

$$\frac{p - p_m}{R};$$

is the current equal to the radiated fraction of bubble volume velocity; C is the capacitor equivalent to compressibility of bubble, $$C = \frac{V}{\gamma P(H)};$$

L is the inductor equivalent to the inertia of oscillating water mass attached to the bubble, $$L = \frac{\rho a}{S};$$

$C_m$ is the capacitor equivalent to the elasticity of the membrane, $$C_m = \frac{Sa^2}{E_{dx}};$$

R is the radiation resistor, $$R = \frac{\rho C}{S}.$$

Figure 14:
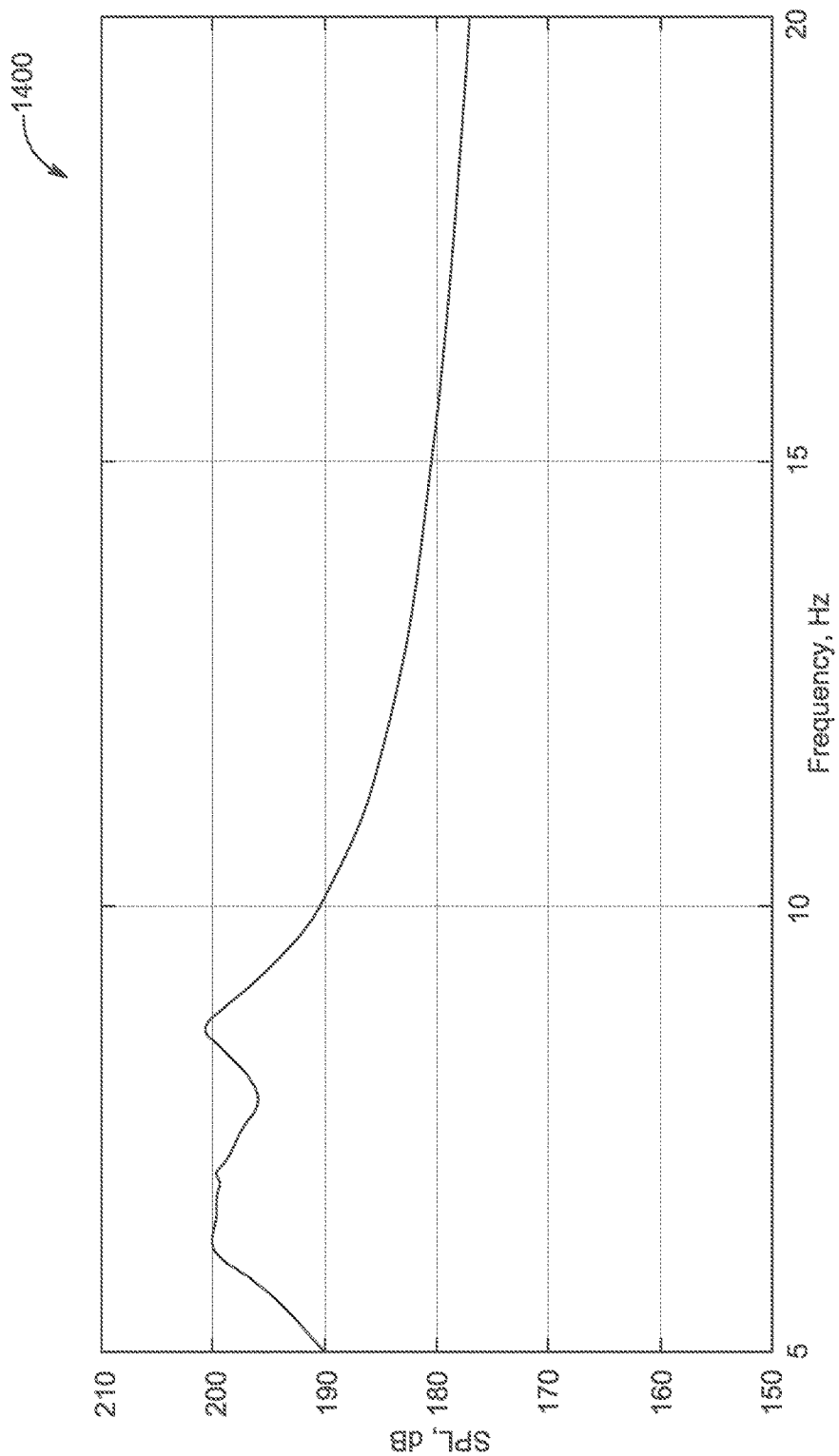
FIG. 14 is a graph of computer simulated frequency response of a doubly-resonant seismic source with a pneumatic blower driver according to an aspect of the present disclosure.

FIG. 14 shows a graph 1400 that comprises simulation results with reference to the doubly-resonant broadband seismic sound source of FIG. 12. The simulation has been performed using the differential equations 1)-5) for each bubble with the different parameters. The graph shows the pressure $P_a = p - p_m$ on the external surface of the bubble. The graph 1400 illustrates the ability of that driver to cover the frequency range from 5 to 20 Hz.

Dual-Resonant Broadband Seismic Source Comprising a Simile Aperture Resonator

In alternative aspects of the present disclosure, the dual-resonant broadband seismic source may comprise a single bubble resonator and at least one different type of resonator. In one aspect of the present disclosure, FIG. 15 illustrates a dual-resonant broadband seismic source 1500 comprising a single aperture resonator (e.g., single bubble) with a dual motor driver. The seismic source 1500 comprises a single gas filled underwater bubble resonator 1502 connected to a gas filled Helmholtz resonator 1504, and at least one excitation member 1506 configured to excite the gas filled Helmholtz resonator 1504 and the single gas filled bubble resonator 1502. The gas that fills the resonators 1502,1504 may be any gas that functions appropriately in the environment that the single aperture seismic source 1500 is to be deployed. For example, the gas may be normal air, oxygen, nitrogen, carbon dioxide, etc., or any combinations thereof as appropriate.

According to various aspects, the single bubble resonator 1502 may be an underwater bubble cylindrical resonator comprising inelastic edges and elastic membrane cylindrical walls under internal pressure. The inelastic edges of the resonator 1502 may be made of a solid material/metal, such as, for example, aluminium. Referring back to FIG. 15, the bubble resonator 1502 may comprise an elastic membrane 1508 and a metal end cap 1510. The metal end cap 1510 may comprise aluminium. While the shape of the bubble resonator 1502 is shown and described as cylindrical, the bubble resonator 1502 may be sized and configured as appropriate and the entirety or a portion thereof may include for example, a tubular shape, a square or rectangular shape, a spherical shape, etc. According to various aspects of the present disclosure, the bubble resonator 1502 may be permanently tuned to produce a first resonant frequency upon excitation by the excitation member 1506. The Helmholtz resonator 1504 comprises a structure 1512 that encloses a predetermined volume. In one aspect of the present disclosure, the Helmholtz resonator 1504 is a cylindrical Helmholtz resonator. While the shape of the Helmholtz resonator 1504 is shown and described as cylindrical, the Helmholtz resonator 1504 may be sized and configured as appropriate and the entirety or a portion thereof may include for example, a tubular shape, a square or rectangular shape, a spherical shape, etc. The structure 1512 of the Helmholtz resonator 1504 may comprise a cylindrical throat/neck 1514 defining an opening 1524 on one end of the Helmholtz resonator 1504 (e.g., at its distal end) and a least one cylinder 1522, 1523 defining at least one opening 1516, 1517 on the other end of the Helmholtz resonator 1504 (e.g., at its proximal end). In one aspect of the present disclosure, the Helmholtz resonator 1504 may comprise only one cylinder defining one opening at its proximal end (e.g., FIG. 21). The cylindrical throat 1514 of the Helmholtz resonator 1504 may extend distally into a proximal portion of the bubble resonator 1502. In an alternative aspect, the cylindrical throat 1514 may extend distally into a central portion of the bubble resonator 1502. In one aspect, the structure of the Helmholtz resonator 1504 may comprise aluminium. According to various aspects of the present disclosure, the Helmholtz resonator 1504 may be permanently tuned to produce a second resonant frequency upon excitation by the excitation member 1506. The first resonant frequency of the bubble resonator 1502 may be different from the second resonant frequency of the Helmholtz resonator 1504. In one aspect of the present disclosure, the bubble resonator 1502 may be tuned to the lower edge of a desired frequency band and the Helmholtz resonator 1504 may be tuned to the higher edge of the desired frequency band. According to various aspects, the first and second resonant frequency may be within the frequency band of 5-10 Hz. To obtain a desired resonant frequency of the bubble resonator 1502, an inelastic structure/device, for example, in the form of a tube/tubular hall, may surround at least a portion of the bubble resonator 1502. For example, the elastic membrane 1508 of the bubble resonator 1502 may be partly covered by a solid/rigid cylinder (e.g., See FIG. 2A, 207, 209). In various aspects the solid rigid cylinder may comprise a metal (e.g. aluminum), a composite carbon-fiber or fiber-glass, glass, ceramic, etc., or a combination thereof.

In one aspect of the present disclosure the excitation member 1506 of the single aperture seismic source 1500 may be configured to excite the Helmholtz resonator 1504 and the bubble resonator 1502. Referring to FIG. 15, the bubble resonator 1502 may be excited by pulsating a gas through the throat 1514 of the Helmholtz resonator 1504. In such an aspect, the excitation member 1506 may comprise at least one piston 1518, 1519 driven by at least one motor 1520, 1521. In one aspect of the present disclosure, the excitation member 1506 may comprise only one piston driven by one motor (e.g., FIG. 21). In various aspects, the at least one motor 1520, 1521 may comprise a rotary motor and/or a linear motor. In such aspects, the excitation member 1506 may be configured to control an amplitude of sound emitted by the seismic source 1500 based on a stroke displacement of the at least one linear motor and/or based on a difference of rotation phase of at least one rotary motor. Referring back to FIG. 15, in one aspect of the present disclosure, the cylindrical Helmholtz resonator 1504 comprises two proximal cylinders 1522, 1523 defining two openings 1516, 1517. In such an aspect, each proximal cylinder 1522, 1523 comprises a piston 1518, 1519 driven by a rotary motor 1520, 1521 to reciprocate each piston 1518, 1519 within its respective opening 1516, 1517. In one aspect of the present disclosure the two rotary motors 1520, 1521 rotate with the same rotational speed but are shifted in phase. In various aspects, the pistons 1518, 1519 are configured to change volume and pressure in the cavity 1526 of the Helmholtz resonator 1504 to generate a steady oscillating flow of gas through the cylindrical throat 1514. Here, amplitude of the pressure in the cavity 1526 is based on the phase shift in the rotation of the pistons 1518, 1519 in accordance with the equation:

$$A*\cos(\omega t+\varphi)+A*\cos(\omega t)=B*\cos(\omega t+\varphi/2),$$

$$B=A*\cos(\varphi/2)$$

In such an aspect, the flow of gas through the cylindrical throat 1514 emits sound into the bubble resonator 1502 and the elastic membrane 1508 of the bubble resonator 1502 radiates sound waves into surrounding water.

Referring back to FIG. 15, the single aperture seismic source 1500 may further comprise an internal sensor 1528 (e.g., pressure sensor) positioned within the bubble resonator 1502 and a motor controller 1530. In such an aspect, the motor controller 1530 may be configured to receive a signal (e.g., wired/wirelessly) from the internal sensor 1528, to compare the internal sensor signal to a reference signal 1532 (e.g., from a hydrophone), and to correct amplitude and rotational speed to match the internal sensor 1528 signal in accordance with the reference signal 1532 to repeat the reference signal 1532 with a minimum mean square error. Such a system can control amplitude and frequency of the radiated signal however it cannot support an arbitrary waveform. An arbitrary waveform, if desired, can be transmitted utilizing a regenerative blower as described herein.

In another alternative aspect of the present disclosure, FIG. 16 illustrates a dual-resonant broadband seismic source 1600 comprising a single bubble resonator (e.g., single aperture) with a turbo blower driver. The seismic source 1600 comprises a single gas filled underwater bubble resonator 1602 connected to a gas filled Helmholtz resonator 1604, and at least one excitation member 1606 configured to excite the gas filled Helmholtz resonator 1604 and the single gas filled bubble resonator 1602. The gas that fills the resonators 1602,1604 may be any gas that functions appropriately in the environment that the single aperture seismic source 1600 is to be deployed. For example, the gas may be normal air, oxygen, nitrogen, carbon dioxide, etc., or any combinations thereof as appropriate.

According to various aspects, the single bubble resonator 1602 may be an underwater bubble cylindrical resonator comprising inelastic edges and elastic membrane cylindrical walls under internal pressure. The inelastic edges of the resonator 1602 may be made of a solid material/metal, such as, for example, aluminium. Referring back to FIG. 16, the bubble resonator 1602 may comprise an elastic membrane 1608 and a metal end cap 1610. The metal end cap 1610 may comprise aluminium. While the shape of the bubble resonator 1602 is shown and described as cylindrical, the bubble resonator 1602 may be sized and configured as appropriate and the entirety or a portion thereof may include for example, a tubular shape, a square or rectangular shape, a spherical shape, etc. According to various aspects of the present disclosure, the bubble resonator 1602 may be permanently tuned to produce a first resonant frequency upon excitation by the excitation member 1606. The Helmholtz resonator 1604 comprises a structure 1612 that encloses a predetermined volume. In one aspect of the present disclosure, the Helmholtz resonator 1604 is a cylindrical Helmholtz resonator. While the shape of the Helmholtz resonator 1604 is shown and described as cylindrical, the Helmholtz resonator 1604 may be sized and configured as appropriate and the entirety or a portion thereof may include for example, a tubular shape, a square or rectangular shape, a spherical shape, etc. The structure 1612 of the Helmholtz resonator 1604 may comprise a cylindrical throat/neck 1614 defining an opening 1624 on one end of the Helmholtz resonator 1604 (e.g., at its distal end) and a least one cylinder 1622, 1623 defining at least one opening 1616, 1617 on the other end of the Helmholtz resonator 1604 (e.g., at its proximal end). The cylindrical throat 1614 of the Helmholtz resonator 1604 may extend distally into a proximal portion of the bubble resonator 1602. In an alternative aspect, the cylindrical throat 1614 may extend distally into a central portion of the bubble resonator 1602. In one aspect, the structure of the Helmholtz resonator 1604 may comprise aluminium. According to various aspects of the present disclosure, the Helmholtz resonator 1604 may be permanently tuned to produce a second resonant frequency upon excitation by the excitation member 1606. The first resonant frequency of the bubble resonator 1602 may be different from the second resonant frequency of the Helmholtz resonator 1604. In one aspect of the present disclosure, the bubble resonator 1602 may be tuned to the lower edge of a desired frequency band and the Helmholtz resonator 1604 may be tuned to the higher edge of the desired frequency band. According to various aspects, the first and second resonant frequency may be within the frequency band of 5-10 Hz. To obtain a desired resonant frequency of the bubble resonator 1602, an inelastic structure/device, for example, in the form of a tube/tubular hall, may surround at least a portion of the bubble resonator 1602. For example, the elastic membrane 1608 of the bubble resonator 1602 may be partly covered by a solid/rigid cylinder (e.g., See FIG. 2A, 207, 209). In various aspects the solid rigid cylinder may comprise a metal (e.g. aluminum), a composite carbon-fiber or fiber-glass, glass, ceramic, etc., or a combination thereof.

In one aspect of the present disclosure the excitation member 1606 of the single aperture seismic source 1600 may be configured to excite the Helmholtz resonator 1604 and the bubble resonator 1602. Referring to FIG. 16, the bubble resonator 1602 may be excited by pulsating a gas through the throat 1614 of the Helmholtz resonator 1604. In such an aspect, the excitation member 1606 may comprise a regenerative rotary blower 1620 (e.g., a regenerative rotary turbo-compressor) positioned at a proximal end of the seismic source 1600. In view of FIG. 16, in one aspect of the present disclosure, the cylindrical Helmholtz resonator 1604 comprises two proximal cylinders 1622, 1623. In such an aspect, the first proximal cylinder 1622 defines an opening 1616 and may comprise a first electrically controllable proportional valve/vent 1618 and the second proximal cylinder 1623 defines an opening 1617 and may comprise a second electrically controllable proportional valve/vent 1619. In various aspects the first proportional valve/vent 1618 and/or the second proportional valve/vent 1619 may be substituted with a different type of valve [e.g., a butterfly valve, a moving sleeve valve, a siren disc (e.g., rotated by a motor) that periodically opens a path to the positive and negative pressure chamber accumulators 1634/1638, etc.]. Furthermore, in such an aspect, a positive pressure chamber 1634 may fluidically couple a high pressure side 1636 of the rotary blower 1620 to the first proximal cylinder 1622 of the Helmholtz resonator 1604 and a negative pressure chamber 1638 may fluidically couple a low pressure side 1640 of the rotary blower 1620 to the second proximal cylinder 1623 of the Helmholtz resonator 1604. The pressures in the positive pressure chamber 1634 and the negative pressure chamber 1638 are supported by the continuously rotating rotary blower 1620. In one aspect the rotary blower is rotated by an electric rotary motor. The rotary blower 1620 function is to keep the constant pressure difference in the positive pressure chamber 1634 and the negative pressure chamber 1638. In alternative aspects of the present disclosure, the rotary blower 1620 may have a different design depending on the requisite power and pressure of the air flow (e.g., rotary lobe, side channel, centrifugal blower, rotary-screw compressor, etc.). For example, of high power is necessary two rotary blowers may be used (e.g., one rotary blower for positive pressure and another rotary blower for negative pressure).

Referring again to FIG. 16, the single aperture seismic source 1600 may further comprise an internal sensor 1628 (e.g., pressure sensor) positioned within the bubble resonator 1602 and a valve/vent controller 1630. In one aspect of the present disclosure, the valve/vent controller 1630 may comprise a number of op-amps. In reference to FIG. 16, an initial open-loop op-amp 1642 may be used to match a reference signal 1632 (e.g., from a hydrophone) received at its non-inverting input (V+) to a signal received (e.g. wired/wirelessly) from the internal sensor 1628 at its inverting input (V−). The output of the initial op-amp 1642 may then feed the inverting input (V−) of a first open-loop op-amp 1644 to regulate (e.g., open and/or close) the first electrically controllable valve/vent 1618 and the non-inverting input (V+) of a second open-loop op-amp 1646 to regulate (e.g., open and/or close) the second electrically controllable valve/vent 1619. In various aspects of the present disclosure, at least one of the first or second electrically controllable valves/vents 1618, 1619 may be used to regulate/control the flow of gas through the throat 1614 of the Helmholtz resonator 1604. In various aspects the first and second electrically controllable valves/vents 1618, 1619 are configured to change volume and pressure in the cavity 1626 of the Helmholtz resonator 1604 to generate a steady oscillating flow of gas through the cylindrical throat 1614. In such an aspect, the flow of gas through the cylindrical throat 1614 emits sound into the bubble resonator 1602 and the elastic membrane 1608 of the bubble resonator 1602 radiates sound waves into surrounding water.

In an alternative aspect of the present invention, the single aperture seismic source 1600 may further comprise an internal sensor 1628 (e.g., pressure sensor) and a valve/vent controller 1630. In such an aspect, the valve/vent controller 1630 may be configured to receive a signal (e.g., wired/wirelessly) from the internal sensor 1628, to compare the internal sensor signal to a reference signal 1632 (e.g. from a hydrophone), and to regulate/control the first and second electrically controllable valves/vents 1618, 1619 to match the internal sensor 1628 signal to the reference signal 1632 with a minimum mean square error.

In various aspects, the seismic source 1600 of FIG. 16, comprising the rotary blower 1620, is operable to transmit an arbitrary waveform. For example, the first and second electrically controllable valves/vents 1618, 1619 may be controlled by voice coils, similar to an electro-magnetic voice coil (e.g., like in a load speaker), to emit an arbitrary waveform of sound pressure.

Figure 17:
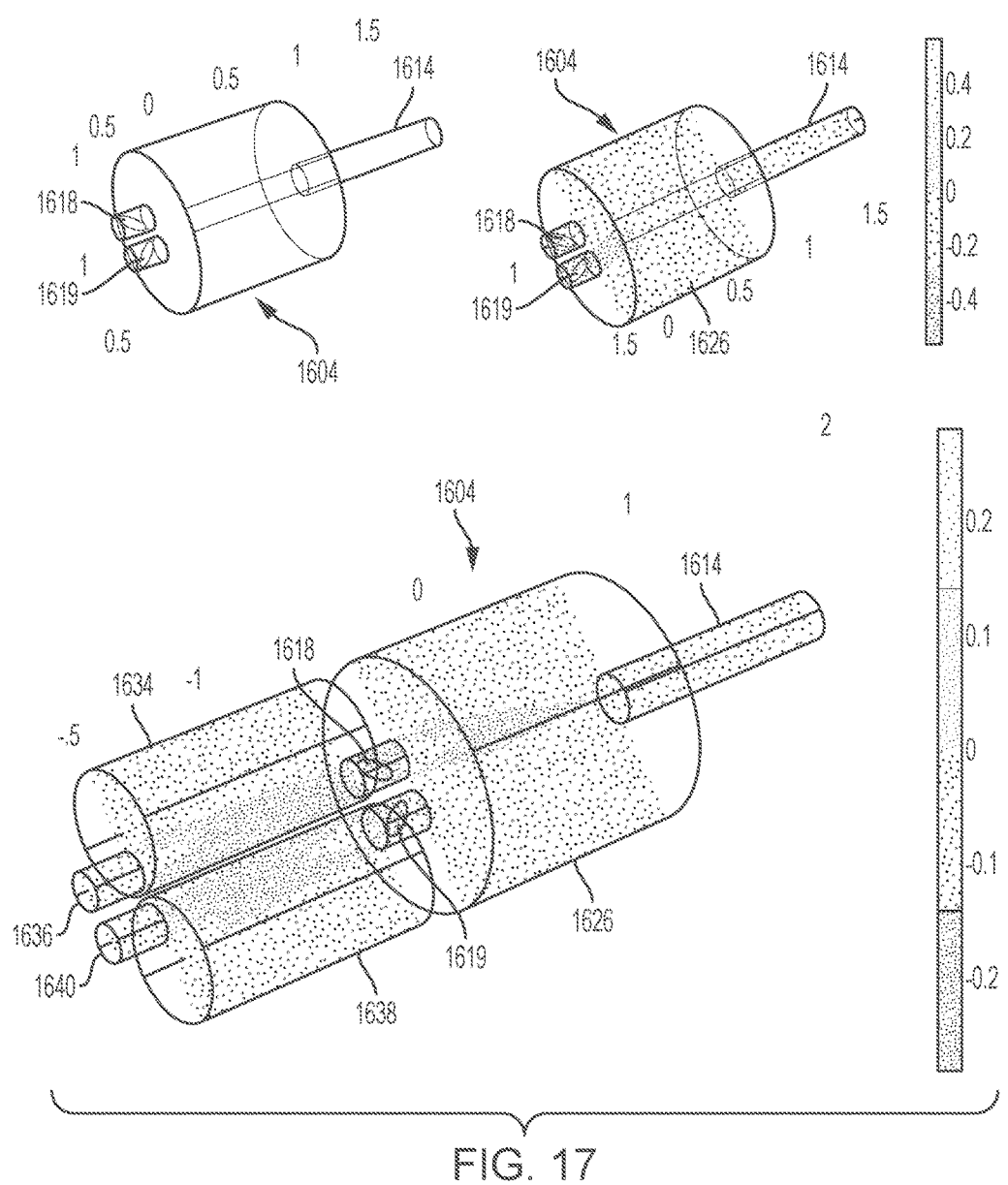
FIG. 17 illustrates a finite-element computational fluid dynamics (CFD) analysis of a Helmholtz resonator with controlled air valves according to an aspect of the present disclosure.

FIG. 17 illustrates a finite-element computational fluid dynamics (CFD) analysis of a Helmholtz resonator 1604 with controlled air valves 1618, 1619 according to an aspect of the present disclosure. The illustrations portray example air flows through the electrically controllable valves 1618, 1619 toward the Helmholtz throat 1614 through the Helmholtz cavity 1626. Referring to FIG. 17, an illustration portrays example air flows from a high pressure side of a rotary blower 1636 through a positive pressure chamber 1634 through the electrically controllable valve 1618 toward the Helmholtz throat 1614 through the Helmholtz cavity 1626 as well as air flows from the Helmholtz cavity 1626 through the electrically controllable valve 1619 through a negative pressure chamber 1638 and to a low pressure side of the rotary blower 1640.

Electrical Circuit Model

The standard electrical circuit model of acoustical structures suggests equivalence of sound pressure P to electrical voltage U and volume velocity V to electrical current I. In that case compliance of medium corresponds to an electrical capacitor with a capacity C and inertia of water mass corresponds to an electrical inductor with an inductance L.

Newton's law for spherically symmetrical water oscillations gives the equation:

$$v = -\frac{1}{\rho}\frac{\partial}{\partial r}\int_{-\infty}^{t} P(t)dt,$$

where v is the particle water velocity, P(t) is the sound pressure, r is the radius from the central of spherical symmetry, ρ is the water density, and t is the time.

A spherically symmetric pressure has the general view waveform:

$$P(t) = \frac{f\left(t - \frac{r}{c}\right)}{r},$$

where f(t) is the arbitrary wave, and c is the sound velocity.

From these two general equations one can obtain a general form for a spherically symmetric wave:

$$v = \frac{P(t)}{\rho c} + \frac{1}{\rho r}\int_{-\infty}^{t} P(t)dt$$

Values for a radiation resistor $R_B$ and attached water inductance $L_B$ follow from the last integral equation:

$$R_B = \frac{\rho c}{A_B};$$

$$L_B = \frac{\rho a}{A_B} = R_B\frac{a}{c},$$

where $A_B$ is the bubble surface area, a is the bubble radius.

Compliance (capacity) of the bubble has a gas compressibility form of:

$$C_B = \frac{V_B}{P_B\gamma},$$

where γ≈1.4 is the ratio of the specific heat at constant pressure to specific heat at constant volume for gas within the bubble, $P_B$ is the pressure inside bubble, and $V_B$ is the bubble volume.

Finally we obtain equation for the transfer function:

$$U = \frac{I}{i\omega C_H(L_H Y_B + 1) + Y_B}; Y_B = i\omega C_B + \frac{1}{i\omega L_B} + \frac{1}{R_B},$$

where $$C_H = \frac{V_H}{P_B \gamma}$$

is the compliance (capacity) of the Helmholtz cavity, or gas compressibility;

$$L_H = \frac{\rho_a l_H}{A_H}$$

is the inductance of inertia of air in a Helmholtz throat with the area $A_H$ and length $l_H$, and $\rho_a$ is the air density.

Figure 18:
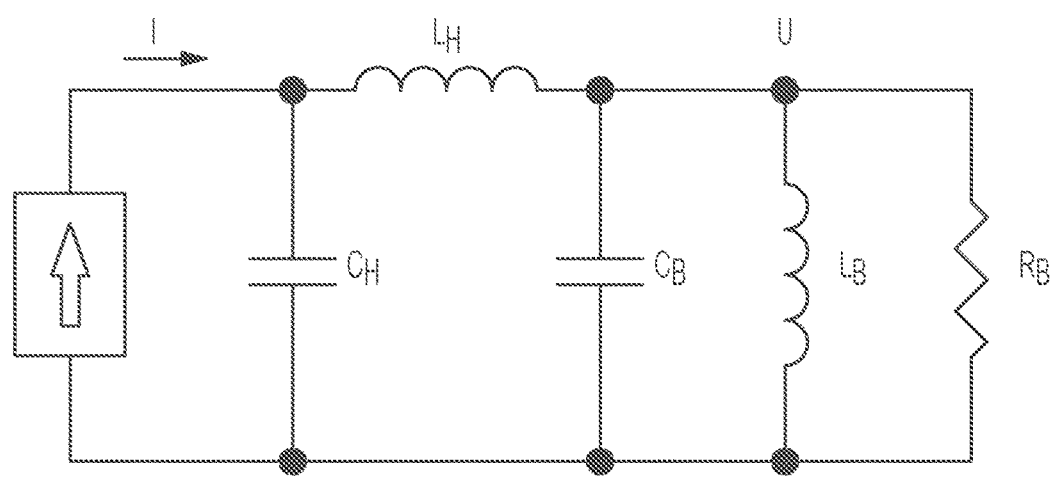
FIG. 18 illustrates an equivalent electrical circuit for a dual-resonant single aperture transducer according to an aspect of the present disclosure.

FIG. 18 illustrates an equivalent electrical circuit for a dual-resonant single aperture transducer according to an aspect of the present disclosure.

The frequency of the first bubble resonator is: $\omega_B = 1/\sqrt{(C_B + C_H) L_B}$. In that resonance two volumes are both determine compliance of the system.

The frequency of the second Helmholtz resonance is: $\omega_H = 1/\sqrt{C_H * C_B * L_H / (C_H + C_B)}$. In that resonance two capacitors are operating in series, because the air in the Helmholtz throat is oscillating between two springing volumes. These frequencies are tuned to the edges of the frequency band (e.g., 6 Hz and 18 Hz). Notably the spectrum from the driver is filtrating twice: first in the Helmholtz resonator and then in the bubble resonator.

Figure 20:
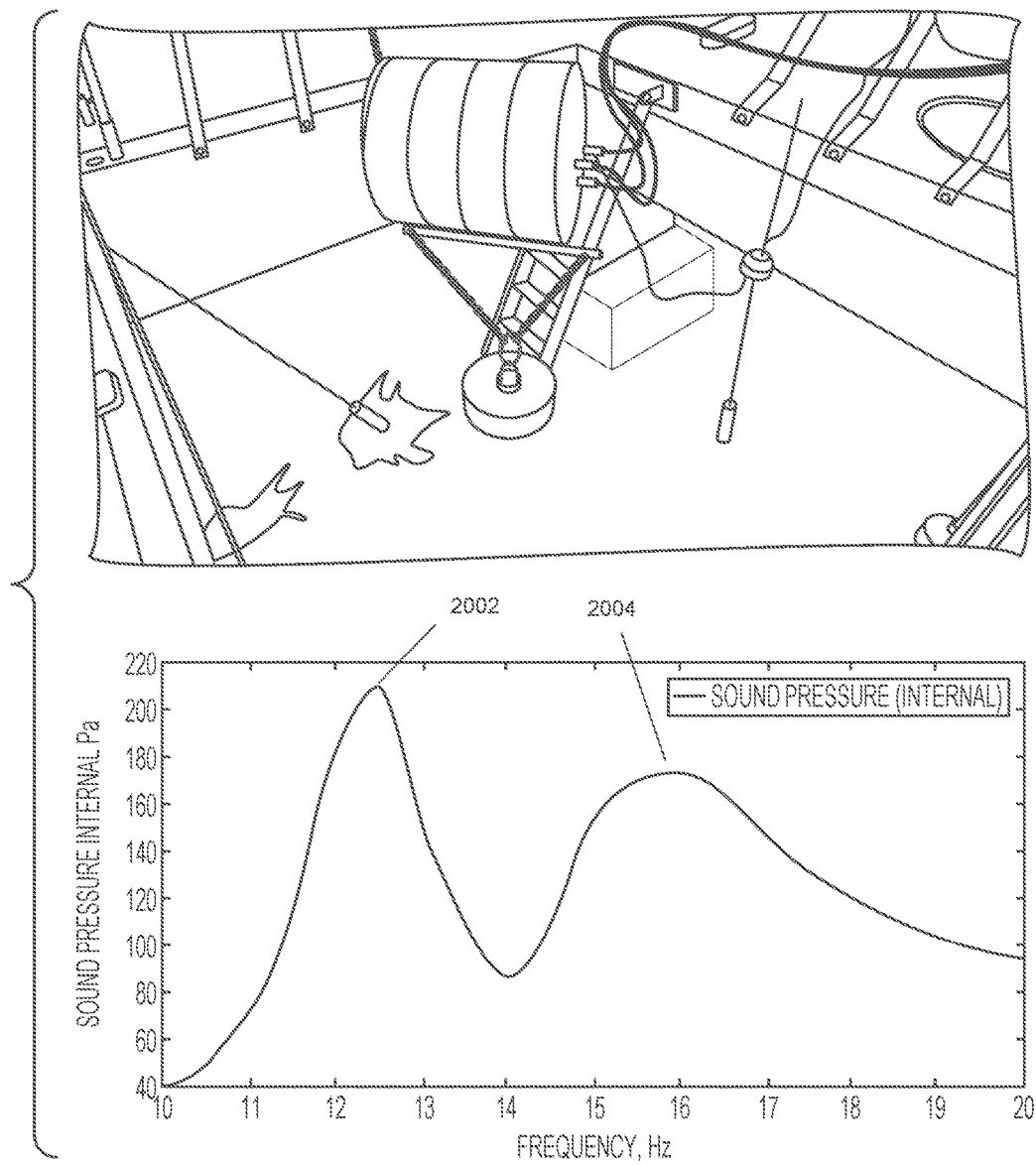
FIG. 20 is a graph of the dependence of sound pressure inside a resonator of a dual-resonant broadband seismic source comprising a single bubble resonator according to an aspect of the present disclosure.

FIG. 20 illustrates the dependence of sound pressure inside a dual-resonant broadband seismic source comprising a single bubble resonator according to an aspect of the present disclosure. Referring to FIG. 20, the resonant frequencies 2002, 2004 of the single aperture seismic source are about 12.5 Hz and about 16 Hz producing sound pressure levels more than 200 dB. The frequency response of the single aperture seismic source covers a frequency band of 10-20 Hz.

Figure 19:
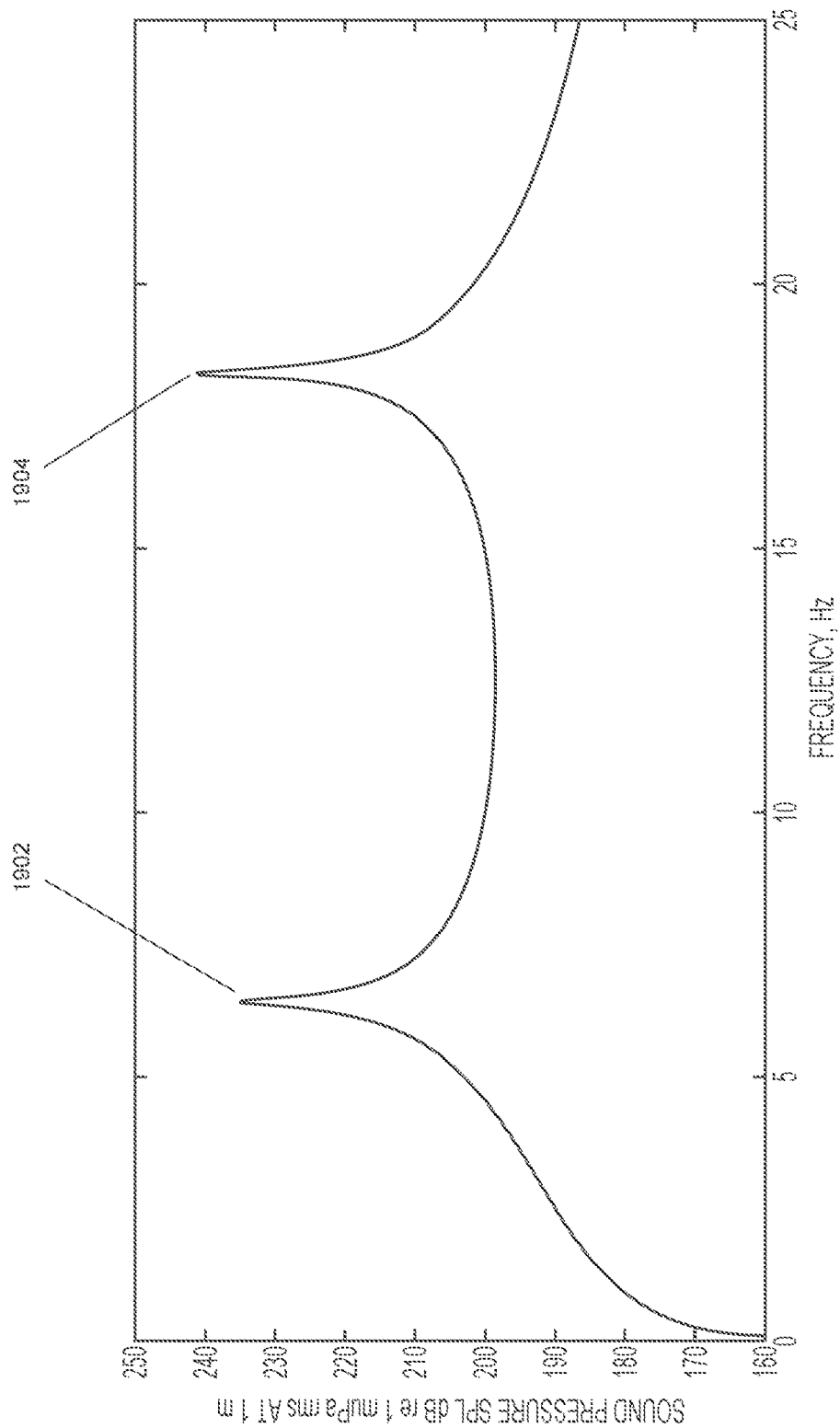
FIG. 19 is a graph of the sound pressure level of a dual-resonant broadband seismic source comprising a single bubble resonator according to an aspect of the present disclosure.

Theory based on lamped element acoustic simulation can predict the main resonances, frequency response and sound pressure level. FIG. 19 illustrates the results of Matlab simulation of a dual resonant single aperture seismic source. Parameters of the simulation comprise: bubble volume 2.3562 m³, aperture 9.425 m², Helmholtz cavity volume 0.7854 m³, Helmholtz tube length 1.5 m, Helmholtz tube diameter 0.254 m, and water depth 10 m. Referring to FIG. 19, the resonant frequencies 1902, 1904 of the single aperture seismic source are about 6 Hz and about 18 Hz producing sound pressure levels of about 235 dB and about 240 dB respectively. The frequency response of the single aperture seismic source covers a frequency band of 5-20 Hz.

That calculation is very approximate to get better prediction complete 3D simulation is necessary. The results of complete 3D finite element analysis simulation and axial symmetrical 2D simulation are shown below in FIGS. 21-26.

Figure 21:
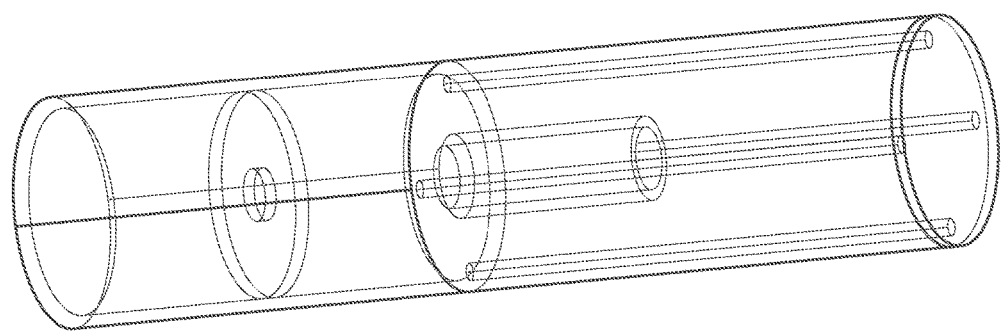
FIG. 21 illustrates a 3D model of a dual-resonant single aperture seismic source used for a 3D finite element analysis simulation.

FIG. 21 illustrates a 3D model of the dual-resonant single aperture seismic source used for the 3D finite element analysis simulation. Parameters of the simulation comprise: a single piston acoustical driver, sound source cylinder diameter 1 m, length 4.5 m, length of rubber covered cylinder portion 2.5 m.

Figure 22:
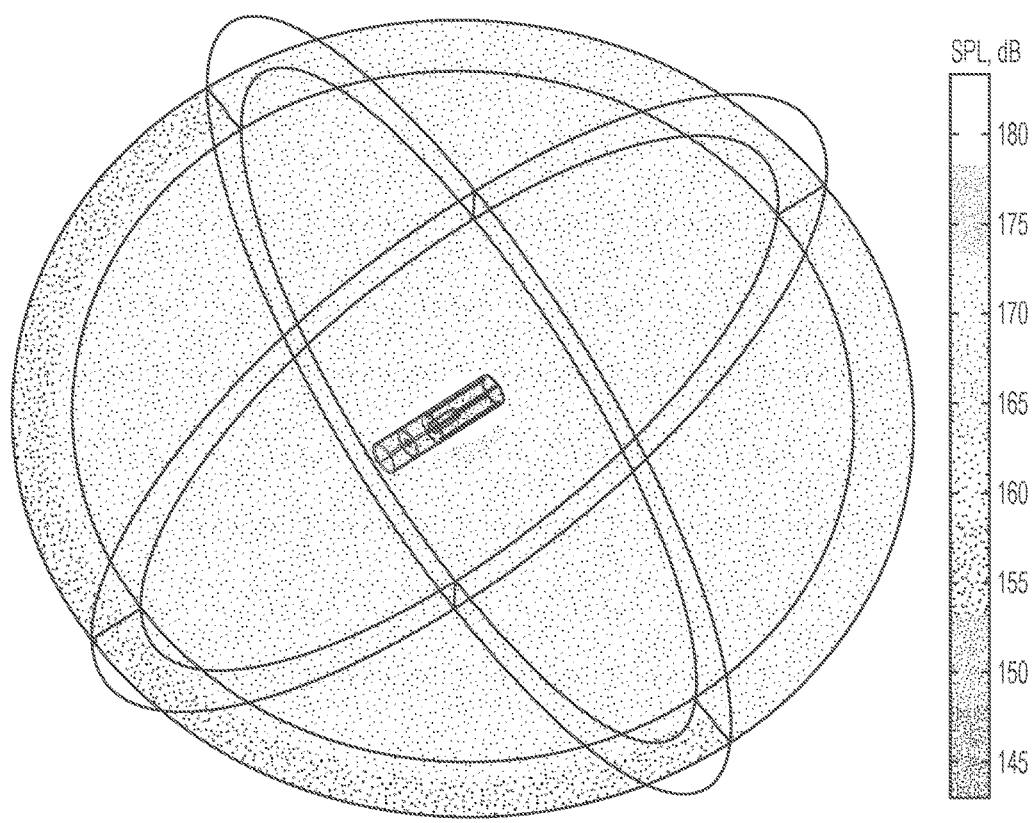
FIG. 22 illustrates a sound pressure level (SPL) simulation for the 3D model of FIG. 21.

FIG. 22 illustrates a sound pressure level (SPL) simulation for the 3D model of FIG. 21. The sound was simulated inside a sphere surrounded by perfect matched level (PML) to absorb sound propagating outside of that sphere.

Figure 23:
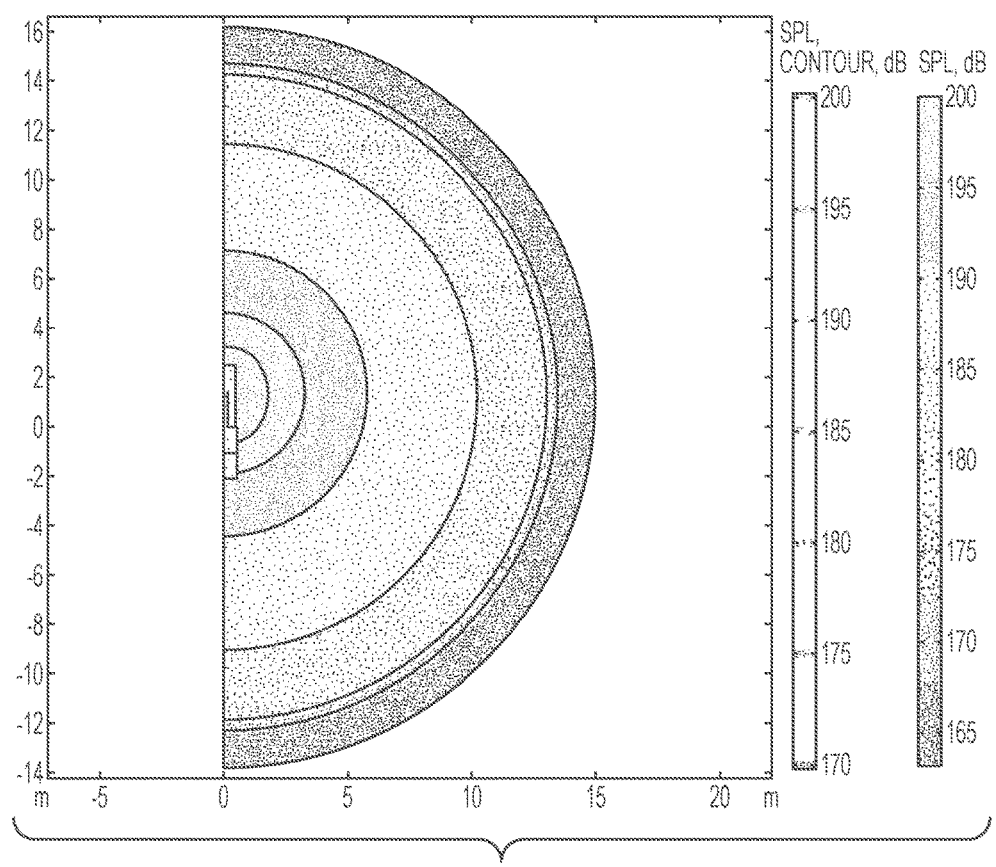
FIG. 23 illustrates computer simulation results of 2D distribution of SPL in dB for the 3D model of FIG. 21.

FIG. 23 illustrates computer simulation results of 2D distribution of SPL in dB for the 3D model of FIG. 21.

Figure 24:
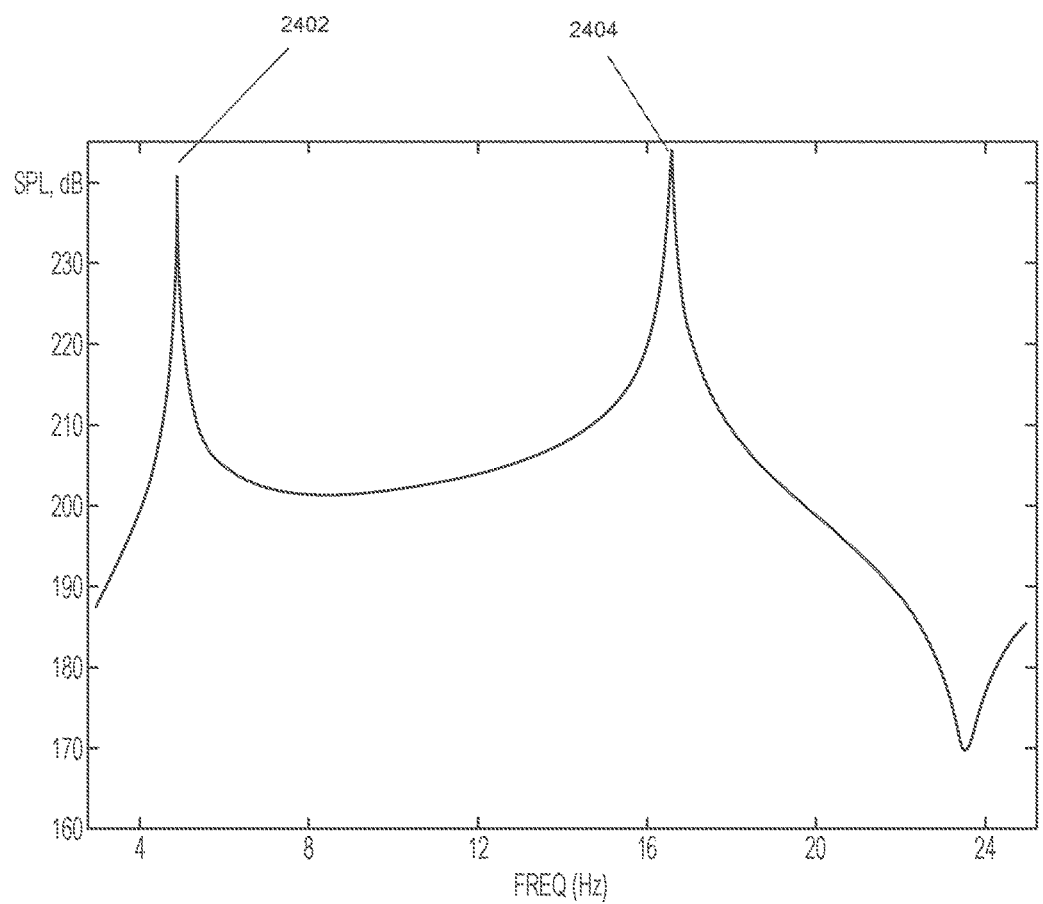
FIG. 24 is a graph of the sound pressure level of the 3D model of FIG. 21.

FIG. 24 illustrates results of the 3D finite element analysis. FIG. 24 is a graph of the sound pressure level of the 3D model of FIG. 21. Referring to FIG. 24, the resonant frequencies 2402, 2404 of the single aperture seismic source are about 5 Hz and about 17 Hz producing sound pressure levels higher than 200 dB. The frequency response of the single aperture seismic source covers a frequency band of 4-18 Hz. Referring to FIG. 24, the simulation predicts the minimum sound pressure levels (e.g., out of resonance, between the two peaks) and the frequencies of the resonance frequencies. However, the high sound pressure levels at the resonances (e.g., about 240 dB and about 248 dB respectively) may not be reached in practice. For example, such levels may not be realistically reached due to losses in the system (e.g., simulation may not reflect such losses). The simulation was completed for a volume velocity of the acoustical driver 40 liters peak to peak. In various aspects, lower levels may be used.

FIGS. 25A-25B illustrate an experimental design of a medium power dual resonance single aperture sound source 2500 according to one aspect of the present disclosure. Referring to FIGS. 25A-25B, the sound source 2500 may comprise a resonating section 2502 (e.g., single bubble resonator) and a Helmholtz resonator section 2504. In the illustrated aspect, the sound source 2500 may further comprise a single piston assembly 2508 driven by an electric motor 2510 (e.g., 15 kW rotary motor). The sound source 2500 may further comprise a ballast weight 2506 and an access cover 2512 (e.g., to access the motor 2510). In one aspect, the diameter of the rubber cylinder is about 0.56 m and the length of the sound source is about 3 m. In such an aspect the piston driver may support both 7 liters and 10 liters peak to peak displacement of air. The experimental design of FIGS. 25A-25B has been tested at a Woods Hole Oceanographic Institution dock at a depth of 3 and 6 m with a water depth of about 20 m.

Figure 26:
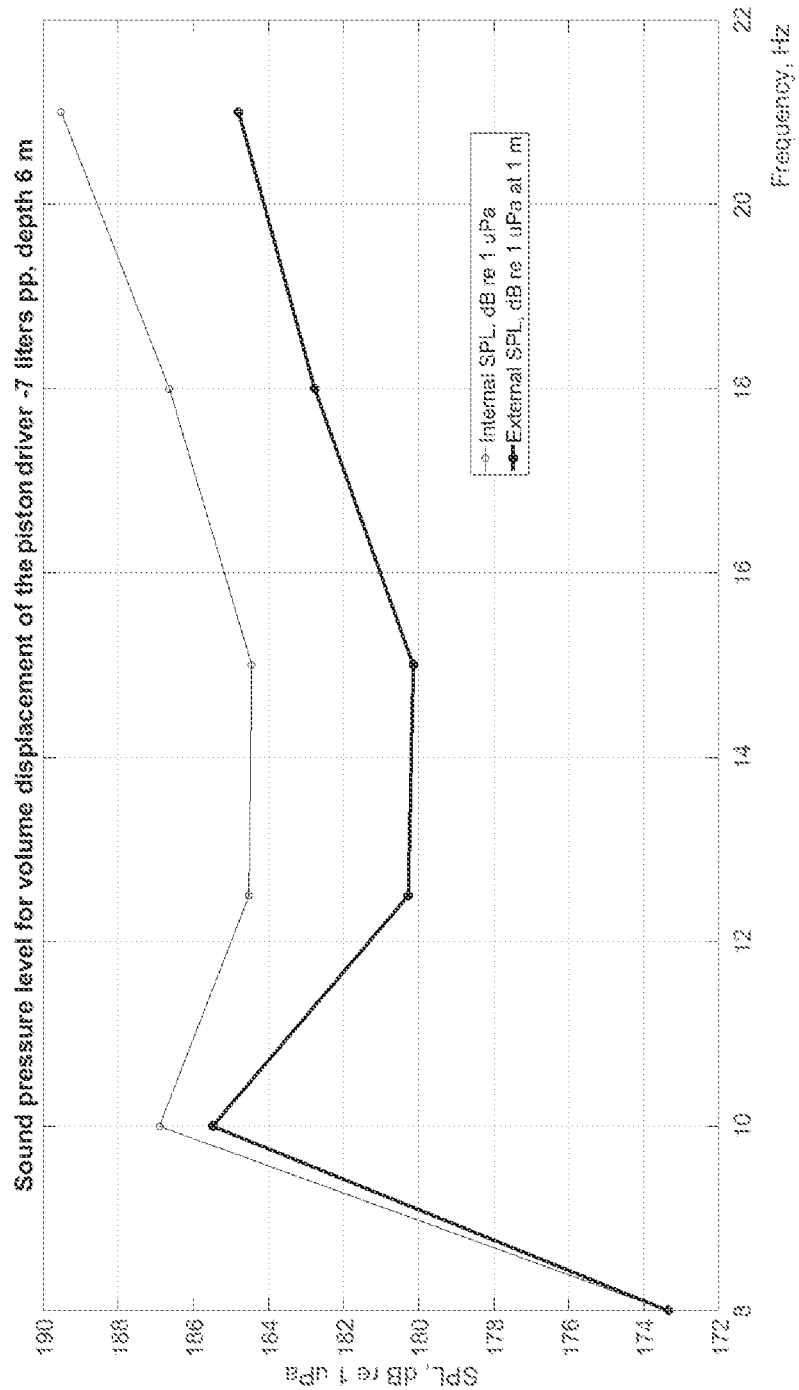
FIG. 26 is a graph of the sound pressure level (SPL) measured for one aspect of the experimental sound source of FIGS. 25A-25B.

FIG. 26 is a graph of the sound pressure level (SPL) experimentally measured at the Woods Hole Oceanographic Institution dock at a depth of 6 m with the inside piston driver displacement at 7 liters peak to peak (pp). The thick line is the external SPL in dB re 1 µPa re-calculated to 1 m. The thin line is the internal SPL in dB re 1 µPa. Notably, there were no high pressure levels at the peaks. Furthermore, the produced flat response is generally difficult to attain. Referring to FIG. 26, the SPL variability is about 3-4 dB over the frequency band of 9-21 Hz.

Figure 27:
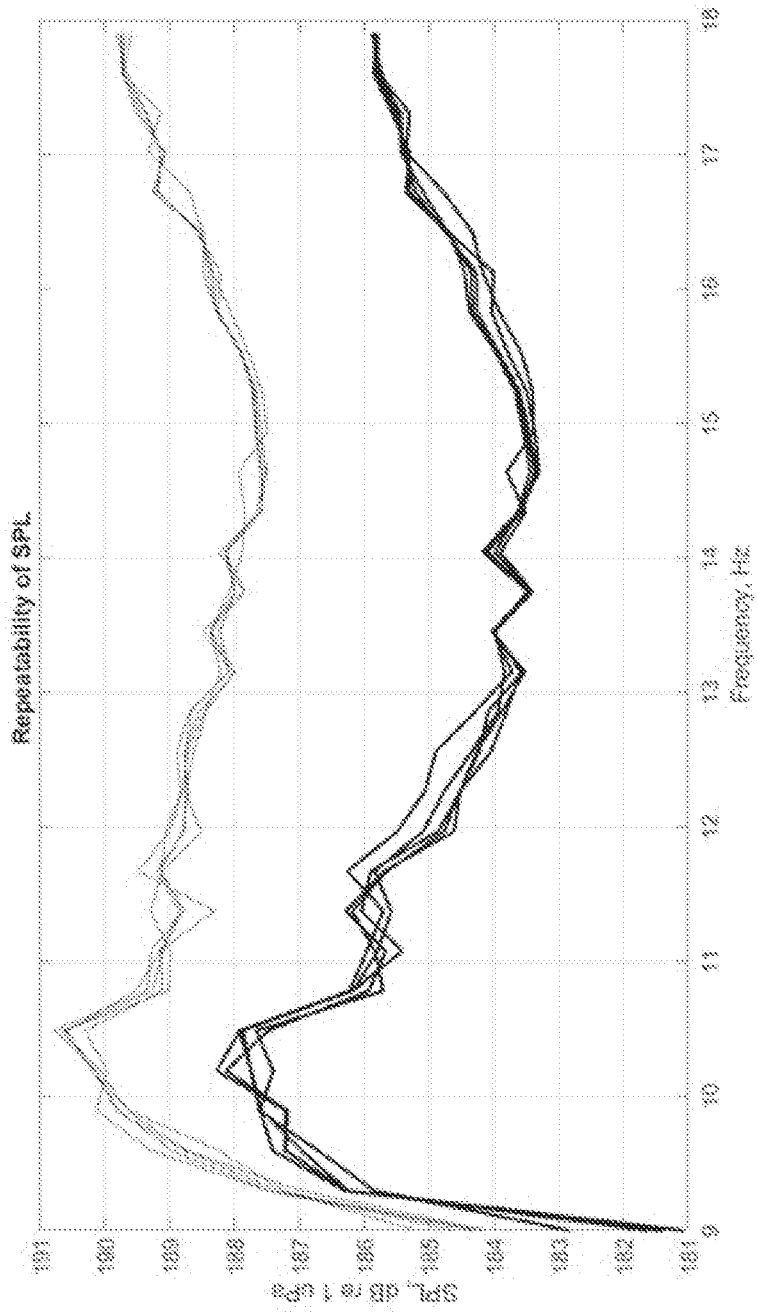
FIG. 27 is a graph of the sound pressure level (SPL) measured for another aspect of the experimental sound source of FIGS. 25A-25B.

FIG. 27 is a graph of the sound pressure level (SPL) experimentally measured at the Woods Hole Oceanographic Institution dock at a depth of 6 m with the inside piston driver displacement at 10 liters peak to peak (pp). A series of five frequency swept transmissions are shown in one graphic to demonstrate stability of that parameter over the frequency band. The thick curves are the external SPL in dB re 1 µPa re-calculated to 1 m. The thin curves are the internal SPL in dB re 1 µPa. Again, there were no high pressure levels at the peaks and the produced flat response is generally difficult to attain. Referring to FIG. 27, the SPL is higher than 183.5 dB and has a variability of about 4 dB over the frequency band (e.g., 9-17.5 Hz).

Figure 28:
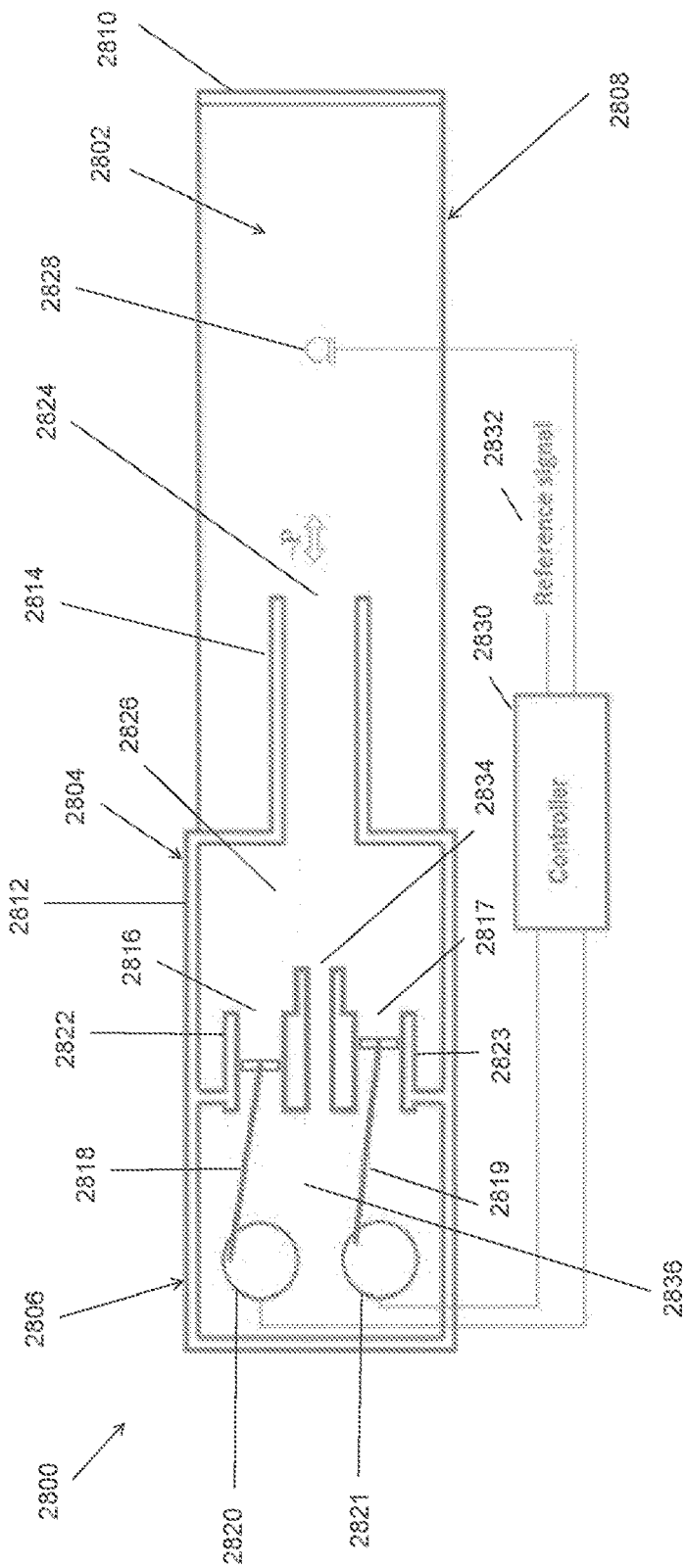
FIG. 28 is a diagram of a dual-resonant broadband seismic source comprising a single bubble resonator with a dual motor driver, comprising an air duct, according to an alternative aspect of the present disclosure.

In an alternative aspect of the present disclosure, FIG. 28 illustrates a dual-resonant broadband seismic source 2800 comprising a single aperture resonator (e.g., single bubble) with a dual motor driver. The seismic source 2800 comprises a single gas filled underwater bubble resonator 2802 connected to a gas filled Helmholtz resonator 2804, and at least one excitation member 2806 configured to excite the gas filled Helmholtz resonator 2804 and the single gas filled bubble resonator 2802. The gas that fills the resonators 2802,2804 may be any gas that functions appropriately in the environment that the single aperture seismic source 2800 is to be deployed. For example, the gas may be normal air, oxygen, nitrogen, carbon dioxide, etc., or any combinations thereof as appropriate.

According to various aspects, the single bubble resonator 2802 may be an underwater bubble cylindrical resonator comprising inelastic edges and elastic membrane cylindrical walls under internal pressure. The inelastic edges of the resonator 2802 may be made of a solid material/metal, such as, for example, aluminium. Referring back to FIG. 28, the bubble resonator 2802 may comprise an elastic membrane 2808 and a metal end cap 2810. The metal end cap 2810 may comprise aluminium. While the shape of the bubble resonator 2802 is shown and described as cylindrical, the bubble resonator 2802 may be sized and configured as appropriate and the entirety or a portion thereof may include for example, a tubular shape, a square or rectangular shape, a spherical shape, etc. According to various aspects of the present disclosure, the bubble resonator 2802 may be permanently tuned to produce a first resonant frequency upon excitation by the excitation member 2806. The Helmholtz resonator 2804 comprises a structure 2812 that encloses a predetermined volume. In one aspect of the present disclosure, the Helmholtz resonator 2804 is a cylindrical Helmholtz resonator. While the shape of the Helmholtz resonator 2804 is shown and described as cylindrical, the Helmholtz resonator 2804 may be sized and configured as appropriate and the entirety or a portion thereof may include for example, a tubular shape, a square or rectangular shape, a spherical shape, etc. The structure 2812 of the Helmholtz resonator 2804 may comprise a cylindrical throat/neck 2814 defining an opening 2824 on one end of the Helmholtz resonator 2804 (e.g., at its distal end) and a least one cylinder 2822, 2823 defining at least one opening 2816, 2817 on the other end of the Helmholtz resonator 2804 (e.g., at its proximal end). In one aspect of the present disclosure, the Helmholtz resonator 2804 may comprise only one cylinder defining one opening at its proximal end (e.g., FIG. 21). The cylindrical throat 2814 of the Helmholtz resonator 2804 may extend distally into a proximal portion of the bubble resonator 2802. In an alternative aspect, the cylindrical throat 2814 may extend distally into a central portion of the bubble resonator 2802. In one aspect, the structure of the Helmholtz resonator 2804 may comprise aluminium. According to various aspects of the present disclosure, the Helmholtz resonator 2804 may be permanently tuned to produce a second resonant frequency upon excitation by the excitation member 2806. The first resonant frequency of the bubble resonator 2802 may be different from the second resonant frequency of the Helmholtz resonator 2804. In one aspect of the present disclosure, the bubble resonator 2802 may be tuned to the lower edge of a desired frequency band and the Helmholtz resonator 2804 may be tuned to the higher edge of the desired frequency band. According to various aspects, the first and second resonant frequency may be within the frequency band of 5-10 Hz. To obtain a desired resonant frequency of the bubble resonator 2802, an inelastic structure/device, for example, in the form of a tube/tubular hall, may surround at least a portion of the bubble resonator 2802. For example, the elastic membrane 2808 of the bubble resonator 2802 may be partly covered by a solid/rigid cylinder (e.g., See FIG. 2A, 207, 209). In various aspects the solid rigid cylinder may comprise a metal (e.g. aluminum), a composite carbon-fiber or fiber-glass, glass, ceramic, etc., or a combination thereof.

In one aspect of the present disclosure the excitation member 2806 of the single aperture seismic source 2800 may be configured to excite the Helmholtz resonator 2804 and the bubble resonator 2802. Referring to FIG. 28, the bubble resonator 2802 may be excited by pulsating a gas through the throat 2814 of the Helmholtz resonator 2804. In such an aspect, the excitation member 2806 may comprise at least one piston 2818, 2819 driven by at least one motor 2820, 2821. In one aspect of the present disclosure, the excitation member 2806 may comprise only one piston driven by one motor (e.g., FIG. 21). In various aspects, the at least one motor 2820, 2821 may comprise a rotary motor and/or a linear motor. In such aspects, the excitation member 2806 may be configured to control an amplitude of sound emitted by the seismic source 2800 based on a stroke displacement of the at least one linear motor and/or based on a difference of rotation phase of at least one rotary motor. Referring back to FIG. 28, in one aspect of the present disclosure, the cylindrical Helmholtz resonator 2804 comprises two proximal cylinders 2822, 2823 defining two openings 2816, 2817. In such an aspect, each proximal cylinder 2822, 2823 comprises a piston 2818, 2819 driven by a rotary motor 2820, 2821 to reciprocate each piston 2818, 2819 within its respective opening 2816, 2817. In one aspect of the present disclosure the two rotary motors 2820, 2821 rotate with the same rotational speed but are shifted in phase. In various aspects, the pistons 2818, 2819 are configured to change volume and pressure in the cavity 2826 of the Helmholtz resonator 2804 to generate a steady oscillating flow of gas through the cylindrical throat 2814. Here, amplitude of the pressure in the cavity 2826 is based on the phase shift in the rotation of the pistons 2818, 2819 in accordance with the equation:

$$A^*\cos(\omega t+\varphi)+A^*\cos(\omega t)=B^*\cos(\omega t+\varphi/2),$$

$$B=A^*\cos(\varphi/2)$$

In such an aspect, the flow of gas through the cylindrical throat 2814 emits sound into the bubble resonator 2802 and the elastic membrane 2808 of the bubble resonator 2802 radiates sound waves into surrounding water.

Referring back to FIG. 28, the single aperture seismic source 2800 may further comprise an internal sensor 2828 (e.g., pressure sensor) positioned within the bubble resonator 2802 and a motor controller 2830. In such an aspect, the motor controller 2830 may be configured to receive a signal (e.g., wired/wirelessly) from the internal sensor 2828, to compare the internal sensor signal to a reference signal 2832 (e.g., from a hydrophone), and to correct amplitude and rotational speed to match the internal sensor 2828 signal in accordance with the reference signal 2832 to repeat the reference signal 2832 with a minimum mean square error. Such a system can control amplitude and frequency of the radiated signal however it cannot support an arbitrary waveform. An arbitrary waveform, if desired, can be transmitted utilizing a regenerative blower as described herein.

Referring again to FIG. 28, the single aperture seismic source 2800 may further comprise at least one resonant air duct 2834 positioned between a motor chamber 2836 and the cavity 2826 of the Helmholtz resonator 2804. In one aspect of the present disclosure, the shape of the at least one air duct 2834 is shown and described as cylindrical. However, in various aspects, the at least one air duct 2834 may be sized and configured as appropriate and the entirety or a portion thereof may include for example, a tubular shape, a square or rectangular shape, a spherical shape, etc. In various aspects of the present disclosure, the air duct 2834 inverts phase air velocity from the piston 2818, 2819 moving inside the motor chamber 3836 180 degrees and moves air inside Helmholtz resonator 2804 in phase with volume velocity from the piston 2818, 2819. This phase inverter is similar to those used in an acoustic subwoofer. The resonance frequency of Helmholtz resonator 2804 with volume of the motor chamber V, internal pressure P, air duct with area S and length L is equal to the $$f = 1 \Big/ \left( 2\pi \sqrt{\frac{\rho L V}{\gamma P S}} \right),$$

where $\rho$ is the density of air, and $\gamma=1.4$ is the adiabatic index. When resonance frequency is smaller than the frequency of the sound source 2800 the volume velocity on the output of the air duct 2834 will be in phase with the volume velocity from the piston 2818, 2819 and will increase the sound pressure level in the bubble resonator 2802. A comparison of sound pressure levels inside the bubble resonator 2802 without the air duct 2834 and with the air duct 2834 is presented in FIG. 29.

Figure 29:
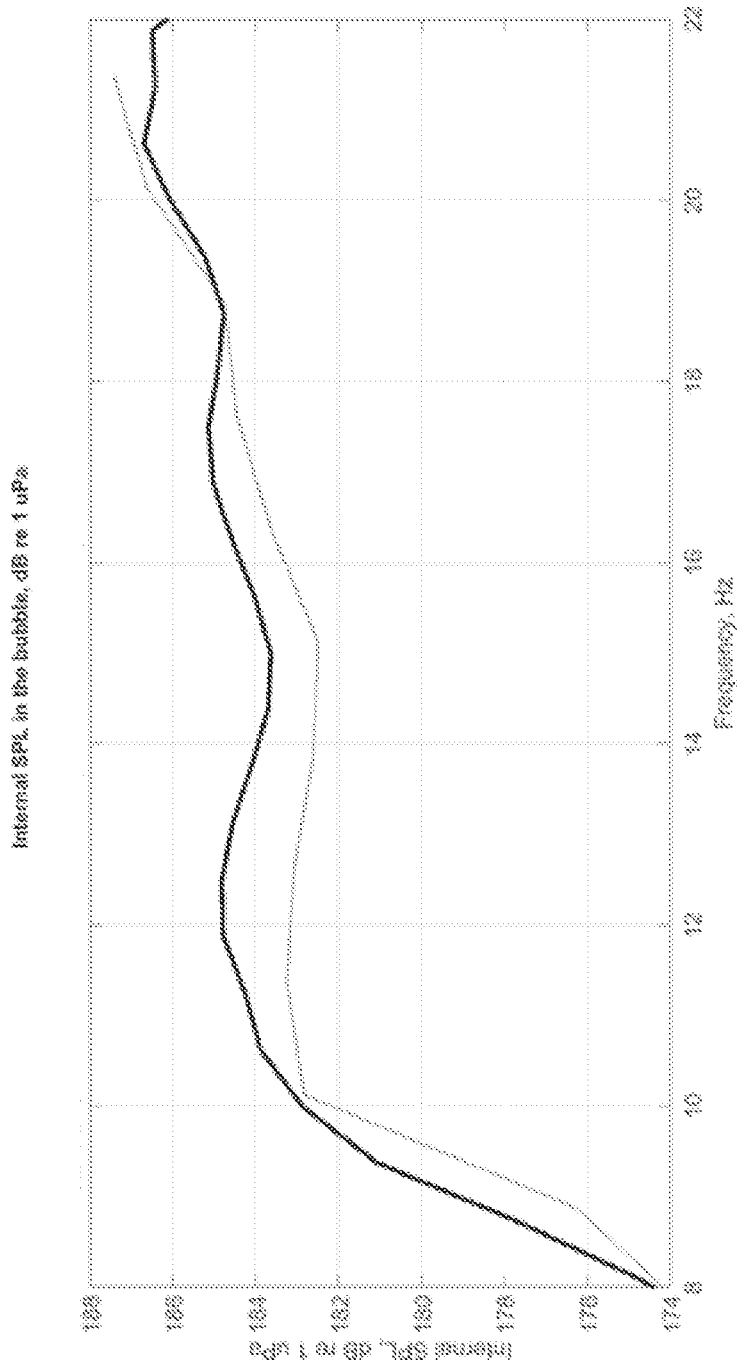
FIG. 29 is a graph comparing sound pressure levels inside a seismic source comprising a single bubble resonator with and without the air duct illustrated in FIG. 28.

Referring to FIG. 29, the thick curve illustrates the internal sound pressure level in the sound source 2800 with an air duct 2834 defined between the motor chamber 2836 and the Helmholtz resonator cavity 2826. Experimental parameters comprise a depth of 2 m, an air duct ID of 2.5 inches, length 30 inches, rubber hardness 70, thickness ⅛ inch, and a driver volume displacement of 7 liters peak to peak (pp). The thin curve illustrates the internal sound pressure level in the sound source 2800 without an air duct 2834 defined between the motor chamber 2836 and the Helmholtz resonator cavity 2826. Experimental parameters comprise a depth of 3 m, no air duct, rubber hardness 70, thickness ⅛ inch, and a driver volume displacement of 7 liters peak to peak (pp). In such an aspect, adding the air duct 2834 increases the sound pressure level about 2 dB.

Reference throughout the specification to "various embodiments," "some embodiments," "one embodiment," "an embodiment", "one aspect," "an aspect" or the like, means that a particular feature, structure, or characteristic described in connection with the embodiment is included in at least one embodiment. Thus, appearances of the phrases "in various embodiments," "in some embodiments," "in one embodiment", or "in an embodiment", or the like, in places throughout the specification are not necessarily all referring to the same embodiment. Furthermore, the particular features, structures or characteristics may be combined in any suitable manner in one or more aspects. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation. Such modifications and variations are intended to be included within the scope of the present invention.

While various details have been set forth in the foregoing description, it will be appreciated that the various aspects of the present disclosure may be practiced without these specific details. For example, for conciseness and clarity selected aspects have been shown in block diagram form rather than in detail. Some portions of the detailed descriptions provided herein may be presented in terms of instructions that operate on data that is stored in a computer memory. Such descriptions and representations are used by those skilled in the art to describe and convey the substance of their work to others skilled in the art.

Unless specifically stated otherwise as apparent from the foregoing discussion, it is appreciated that, throughout the foregoing description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

Some or all of the embodiments described herein may generally comprise technologies for various aspects, or otherwise according to technologies described herein. In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. Those skilled in the art will recognize, however, that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

All of the above-mentioned U.S. patents, U.S. patent application publications, U.S. patent applications, foreign patents, foreign patent applications, non-patent publications referred to in this specification and/or listed in any Application Data Sheet, or any other disclosure material are incorporated herein by reference, to the extent not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

Some aspects may be described using the expression "coupled" and "connected" along with their derivatives. It should be understood that these terms are not intended as synonyms for each other. For example, some aspects may be described using the term "connected" to indicate that two or more elements are in direct physical or electrical contact with each other. In another example, some aspects may be described using the term "coupled" to indicate that two or more elements are in direct physical or electrical contact. The term "coupled," however, also may mean that two or more elements are not in direct contact with each other, but yet still co-operate or interact with each other.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

In summary, numerous benefits have been described which result from employing the concepts described herein. The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated. It is intended that the claims submitted herewith define the overall scope.

Various embodiments are described in the following numbered clauses:

1. A sound source, comprising:
a first gas filled underwater resonator;
a second gas filled underwater resonator connected to the first resonator; and
at least one excitation member configured to excite the first gas filled underwater resonator and the second gas filled underwater resonator; and
wherein the first gas filled underwater resonator is permanently tuned to produce a first resonant frequency upon excitation by the at least one excitation member; and
wherein the gas filled underwater second resonator is permanently tuned to produce a second resonant frequency upon excitation by the at least one excitation member; and
wherein the first resonant frequency is different from the second resonant frequency.

2. The sound source of clause 1, wherein the at least one excitation member moves between an interior chamber of the first gas filled underwater resonator and an interior chamber of the second gas filled underwater resonator in opposite directions.

3. The sound source of clauses 1 or 2, wherein at least one of the first resonant frequency and the second resonant frequency is within a range of 5-20 Hz.

4. The sound source of any one of clauses 1-3, wherein the at least one excitation member comprises at least one piston driven by at least one motor.

5. The sound source of clause 4, wherein the at least one motor comprises a rotary motor or a linear motor.

6. The sound source of any one of clauses 4 or 5, wherein the at least one motor is located between the first gas filled underwater resonator and the second gas filled underwater resonator.

7. The sound source of any one of clauses 1-6, wherein the first resonator comprises a first bubble cylindrical resonator and the second resonator comprises a second bubble cylindrical resonator.

8. The sound source of clause 7, wherein each of the first bubble cylindrical resonator and the second bubble cylindrical resonator has inelastic edges and elastic cylindrical walls under internal pressure.

9. The sound source of clause 8, wherein the first underwater bubble cylindrical resonator is connected to the second underwater bubble cylindrical resonator by a wall.

10. The sound source of any one of clauses 1-9, further comprising an inelastic tube surrounding one of the first resonator or the second resonator.

11. The sound source of any one of clauses 1-10, wherein the at least one excitation member comprises at least one piston driven by at least one motor, wherein the at least one piston is configured to move through at least one aperture of the wall to excite at least one of the first bubble cylindrical resonator and the second bubble cylindrical resonator.

12. The sound source of any one of clauses 1-11, wherein the at least one excitation member is configured to excite the first gas filled underwater resonator and the second gas filled underwater resonator by changing a volume of the interior chamber of the first gas filled underwater resonator and by changing a volume of the interior chamber of the second gas filled underwater resonator.

13. The sound source of any one of clauses 1-12, wherein the at least one excitation member comprises at least one linear motor, and the at least one excitation source is configured to control an amplitude of sound emitted by the sound source based on stroke displacement of the at least one linear motor.

14. The sound source of any one of clauses 1-12, wherein the at least one excitation member comprises first rotary motor and a second rotary motor, and the at least one excitation source is configured to control an amplitude of sound emitted by the sound source based on a phase of rotation of the first rotary motor relative to the second rotary motor.

15. The sound source of any one of clauses 1-12, wherein the at least one excitation member comprises at least one regenerative blower with inlet and outlet proportional valves independently controlling a pneumatic pulse waveform.

16. A sound source, comprising:
a first gas filled resonator tube;
a second gas filled resonator tube connected to the first gas filled resonator tube; and
at least one excitation member configured to excite the first gas filled resonator tube and the second gas filled resonator tube, wherein the at least one excitation member is configured to excite the first gas filled resonator tube and the second gas filled resonator tube by changing a volume of the interior chamber of the first gas filled resonator tube and by changing a volume of the interior chamber of the second gas filled resonator tube; and
wherein the at least one excitation member is configured to excite the first gas filled resonator tube and the second gas filled resonator tube sequentially; and
wherein the first gas filled resonator tube is permanently tuned to produce a first resonant frequency upon excitation by the at least one excitation member; and
wherein the second gas filled resonator tube is permanently tuned to produce a second resonant frequency upon excitation by the at least one excitation member; and
wherein the first resonant frequency is different from the second resonant frequency.

17. A sound source, comprising:
a first gas filled underwater resonator;
a second gas filled underwater resonator connected to the first resonator, wherein the second resonator comprises a Helmholtz resonator; and
at least one excitation member configured to excite the first resonator and the second resonator;
wherein the first resonator is permanently tuned to produce a first resonant frequency upon excitation by the at least one excitation member, wherein the second resonator is permanently tuned to produce a second resonant frequency upon excitation by the at least one excitation member, and wherein the first resonant frequency is different from the second resonant frequency.

18. The sound source of clause 17, wherein the first resonator comprises a bubble resonator including elastic membrane walls.

19. The sound source of clauses 17 or 18, further comprising an inelastic structure covering at least a portion of the elastic membrane walls to tune the first bubble resonator to the first resonant frequency.

20. The sound source of any of clauses 17-19, wherein at least one of the first resonant frequency or the second resonant frequency is within a frequency band of 5-10 Hz.

21. The sound source of any of clauses 17-20, wherein at least one of the first resonant frequency or the second resonant frequency is less than 5 Hz.

22. The sound source of any of clauses 17-21, wherein the at least one excitation member comprises at least one piston driven by at least one motor.

23. The sound source of clause 22, wherein the at least one excitation source is configured to control an amplitude of sound emitted by the sound source based on a stroke displacement of at least one linear motor or a phase of rotation of a first rotary motor relative to a second rotary motor.

24. The sound source of any of clauses 17-21, wherein the at least one excitation member comprises a rotary blower.

25. The sound source of clause 24, further comprising a high pressure chamber and a low pressure chamber, wherein the high and low pressure chambers fluidically couple the rotary blower to the second resonator.

26. The sound source of clause 25, further comprising a first valve, a second valve, and a valve controller, wherein the valve controller is configured to regulate at least one of the first valve or the second valve to control a flow of gas through the second resonator.

27. The sound source of clauses 26, wherein the first valve is configured to control a first flow of gas through the high pressure chamber and the second valve is configured to control a second flow of gas through the low pressure chamber.

28. The sound source of clauses 26 or 27, wherein regulating at least one of the first valve or the second valve independently controls a pneumatic pulse waveform.

29. The sound source of any of clauses 26-28, wherein the valve controller comprises at least one op-amp.

30. The sound source of any of clauses 17-23, wherein the at least one excitation member comprises at least one piston driven by at least one motor, and wherein the sound source further comprises a gas filled motor chamber configured to isolate the at least one motor from water and to allow the at least one piston to move freely inside the motor chamber, and at least one air duct defined between the motor chamber and the second resonator, wherein the at least one air duct is configured to invert the phase of a volume velocity moving inside the motor chamber from the at least one piston 180 degrees such that a volume velocity through the at least one air duct is in phase with a volume velocity moving inside the second resonator from the at least one piston.

31. A sound source, comprising:
a first gas filled resonator, wherein the first resonator comprises a bubble resonator;
a second gas filled resonator connected to the first resonator, wherein the second resonator comprises a Helmholtz resonator; and
at least one excitation member configured to excite the first resonator and the second resonator;
wherein the first resonator is permanently tuned, via an inelastic structure surrounding at least a portion of the first resonator, to produce a first resonant frequency upon excitation by the at least one excitation member, wherein the second resonator is configured to produce a second resonant frequency upon excitation by the at least one excitation member, and wherein the first resonant frequency is different from the second resonant frequency.

32. The sound source of clause 31, wherein at least one of the first resonant frequency or the second resonant frequency is within a frequency band of 5-10 Hz.

The invention claimed is:

1. A sound source, comprising:
   a first gas filled underwater resonator;
   a second gas filled underwater resonator connected to the first resonator, wherein the second resonator comprises a Helmholtz resonator; and
   at least one excitation member configured to excite the first resonator and the second resonator;
   wherein the first resonator is permanently tuned to produce a first resonant frequency upon excitation by the at least one excitation member, wherein the second resonator is permanently tuned to produce a second resonant frequency upon excitation by the at least one excitation member, and wherein the first resonant frequency is different from the second resonant frequency, and
   wherein the gas of the first gas filled underwater resonator and the gas of the second gas filled underwater resonator are retained within the sound source during the production of the first resonant frequency and the production of the second resonant frequency.

2. The sound source of claim 1, wherein the first resonator comprises a bubble resonator including elastic membrane walls.

3. The sound source of claim 2, further comprising an inelastic structure covering at least a portion of the elastic membrane walls to tune the first bubble resonator to the first resonant frequency.

4. The sound source of claim 1, wherein at least one of the first resonant frequency or the second resonant frequency is within a frequency band of 5-10 Hz.

5. The sound source of claim 1, wherein at least one of the first resonant frequency or the second resonant frequency is less than 5 Hz.

6. The sound source of claim 1, wherein the at least one excitation member comprises at least one piston driven by at least one motor.

7. The sound source of claim 6, wherein the at least one excitation source is configured to control an amplitude of sound emitted by the sound source based on a stroke displacement of at least one linear motor or a phase of rotation of a first rotary motor relative to a second rotary motor.

8. The sound source of claim 1, wherein the at least one excitation member comprises a rotary blower.

9. The sound source of claim 8, further comprising a high pressure chamber and a low pressure chamber, wherein the high and low pressure chambers fluidically couple the rotary blower to the second resonator.

10. The sound source of claim 9, further comprising a first valve, a second valve, and a valve controller, wherein the valve controller is configured to regulate at least one of the first valve or the second valve to control a flow of gas through the second resonator.

11. The sound source of claim 10, wherein the first valve is configured to control a first flow of gas through the high pressure chamber and the second valve is configured to control a second flow of gas through the low pressure chamber.

12. The sound source of claim 10, wherein regulating at least one of the first valve or the second valve independently controls a pneumatic pulse waveform.

13. The sound source of claim 1, wherein the at least one excitation member comprises at least one piston driven by at least one motor, and wherein the sound source further comprises:
   a gas filled motor chamber configured to isolate the at least one motor from water and to allow the at least one piston to move freely inside the motor chamber; and
   at least one air duct defined between the motor chamber and the second resonator, wherein the at least one air duct is configured to invert the phase of a volume velocity moving inside the motor chamber from the at least one piston 180 degrees such that a volume velocity through the at least one air duct is in phase with a volume velocity moving inside the second resonator from the at least one piston.

14. A sound source, comprising:
   a first gas filled resonator, wherein the first resonator comprises a bubble resonator;
   a second gas filled resonator connected to the first resonator, wherein the second resonator comprises a Helmholtz resonator; and
   at least one excitation member configured to excite the first resonator and the second resonator;
   wherein the first resonator is permanently tuned, via an inelastic structure surrounding at least a portion of the first resonator, to produce a first resonant frequency upon excitation by the at least one excitation member, wherein the second resonator is configured to produce a second resonant frequency upon excitation by the at least one excitation member, and wherein the first resonant frequency is different from the second resonant frequency, and
   wherein the gas of the first gas filled resonator and the gas of the second gas filled resonator are retained within the sound source during the production of the first resonant frequency and the production of the second resonant frequency.

15. The sound source of claim 14, wherein at least one of the first resonant frequency or the second resonant frequency is within a frequency band of 5-10 Hz.

* * * * *